(12) United States Patent
Gallagher

(10) Patent No.: US 9,938,130 B2
(45) Date of Patent: Apr. 10, 2018

(54) DESKTOP WATER BOTTLE DISPENSER

(71) Applicant: Kenneth John Gallagher, Las Vegas, NV (US)

(72) Inventor: Kenneth John Gallagher, Las Vegas, NV (US)

( * ) Notice: Subject to any disclaimer, the term of this patent is extended or adjusted under 35 U.S.C. 154(b) by 0 days.

(21) Appl. No.: 15/185,082

(22) Filed: Jun. 17, 2016

(65) Prior Publication Data

US 2017/0240412 A1 Aug. 24, 2017

Related U.S. Application Data

(63) Continuation-in-part of application No. 15/047,208, filed on Feb. 18, 2016, now Pat. No. 9,573,798.

(51) Int. Cl.
| | |
|---|---|
| *B67D 3/00* | (2006.01) |
| *F16K 27/06* | (2006.01) |
| *F16K 24/02* | (2006.01) |

(52) U.S. Cl.
CPC .......... *B67D 3/0035* (2013.01); *B67D 3/0061* (2013.01); *F16K 24/02* (2013.01); *F16K 27/06* (2013.01)

(58) Field of Classification Search
CPC .......... B67D 3/04; B67D 3/043; B67D 3/044; F16K 1/00; F16K 1/32; F16K 24/02; F16K 27/06; F16K 27/062; F16K 27/065; F16K 27/067
See application file for complete search history.

(56) References Cited

U.S. PATENT DOCUMENTS

| | | | | |
|---|---|---|---|---|
| 576,241 | A * | 2/1897 | Van Ame | G01F 11/18 222/135 |
| 1,207,505 | A * | 12/1916 | Cordley | B67D 3/0029 137/614.11 |
| 1,236,912 | A * | 8/1917 | Cooper | F24F 3/1603 222/185.1 |
| 1,445,058 | A * | 2/1923 | Appel | B67D 3/0029 222/185.1 |
| 1,727,169 | A * | 9/1929 | Hengesbach | B67D 3/043 251/100 |
| 2,046,474 | A * | 7/1936 | Maggenti | F16K 24/02 137/588 |
| 2,054,881 | A * | 9/1936 | Saunders | G01F 11/003 222/181.1 |
| 2,056,863 | A * | 10/1936 | Napier | B67D 3/0029 222/185.1 |
| 2,113,046 | A * | 4/1938 | Freemon | B67D 3/044 137/588 |
| 2,117,791 | A * | 5/1938 | Damsel | B67D 3/00 222/181.1 |

(Continued)

*Primary Examiner* — Patrick M Buechner

(57) ABSTRACT

A dispenser for delivering a liquid from a supply bottle. The dispenser has a base with a base foot. A tubular support is attached to the base foot. The tubular support extends vertically from the base foot. A rim is attached to the tubular support. The rim extends horizontally from the tubular support at a location above the base foot. The rim is vertically aligned with the base foot. A removable bottle collar engages with the rim. The removable bottle collar is adapted to engage and support the supply bottle inverted and positioned within the rim. The removable bottle collar has a center aperture where a mouth of the supply bottle extends there through.

5 Claims, 37 Drawing Sheets

(56) References Cited

U.S. PATENT DOCUMENTS

| | | | | |
|---|---|---|---|---|
| 2,341,950 A * | 2/1944 | Schepps | B67D 3/0035 | 141/353 |
| 2,445,130 A * | 7/1948 | Turner | B65D 47/06 | 141/290 |
| 2,768,659 A * | 10/1956 | Kirkendall | B67D 3/0029 | 141/301 |
| 3,104,089 A | 9/1963 | Seltsam | | |
| 3,207,472 A | 9/1965 | Seltsam | | |
| 3,246,872 A * | 4/1966 | Seltsam | B67D 3/043 | 251/331 |
| 3,301,525 A | 1/1967 | Chernak | | |
| 3,376,582 A * | 4/1968 | Samuels | B67D 3/00 | 222/488 |
| 3,426,798 A * | 2/1969 | Chernak | B67D 3/043 | 137/625.33 |
| 3,459,345 A * | 8/1969 | Giese | B67D 3/043 | 222/505 |
| 4,293,082 A | 10/1981 | Matsueda | | |
| 4,664,297 A * | 5/1987 | Giovinazzi | B67D 3/044 | 222/185.1 |
| 4,747,520 A * | 5/1988 | Lane, Sr. | B67D 3/046 | 222/181.2 |
| 4,911,334 A * | 3/1990 | Kedzierski | B67D 3/044 | 222/131 |
| 5,123,720 A | 6/1992 | Blomster | | |
| 5,470,044 A * | 11/1995 | Chi | F16K 35/025 | 222/153.1 |
| 5,623,966 A * | 4/1997 | Rodger | F16K 5/0435 | 137/625.32 |
| 5,647,416 A | 7/1997 | Desrosiers | | |
| 6,241,126 B1 | 6/2001 | Goodman | | |
| 6,527,145 B1 | 3/2003 | Bennett, Jr. | | |
| 6,892,903 B1 | 5/2005 | Salvatore Barolotta | | |
| 2004/0004094 A1* | 1/2004 | Chiu | B67D 1/0871 | 222/518 |
| 2008/0169310 A1* | 7/2008 | Mata | B67D 3/043 | 222/185.1 |
| 2008/0314930 A1* | 12/2008 | Green | B67D 3/0035 | 222/185.1 |
| 2013/0334262 A1* | 12/2013 | Banning | B67D 3/04 | 222/505 |

* cited by examiner

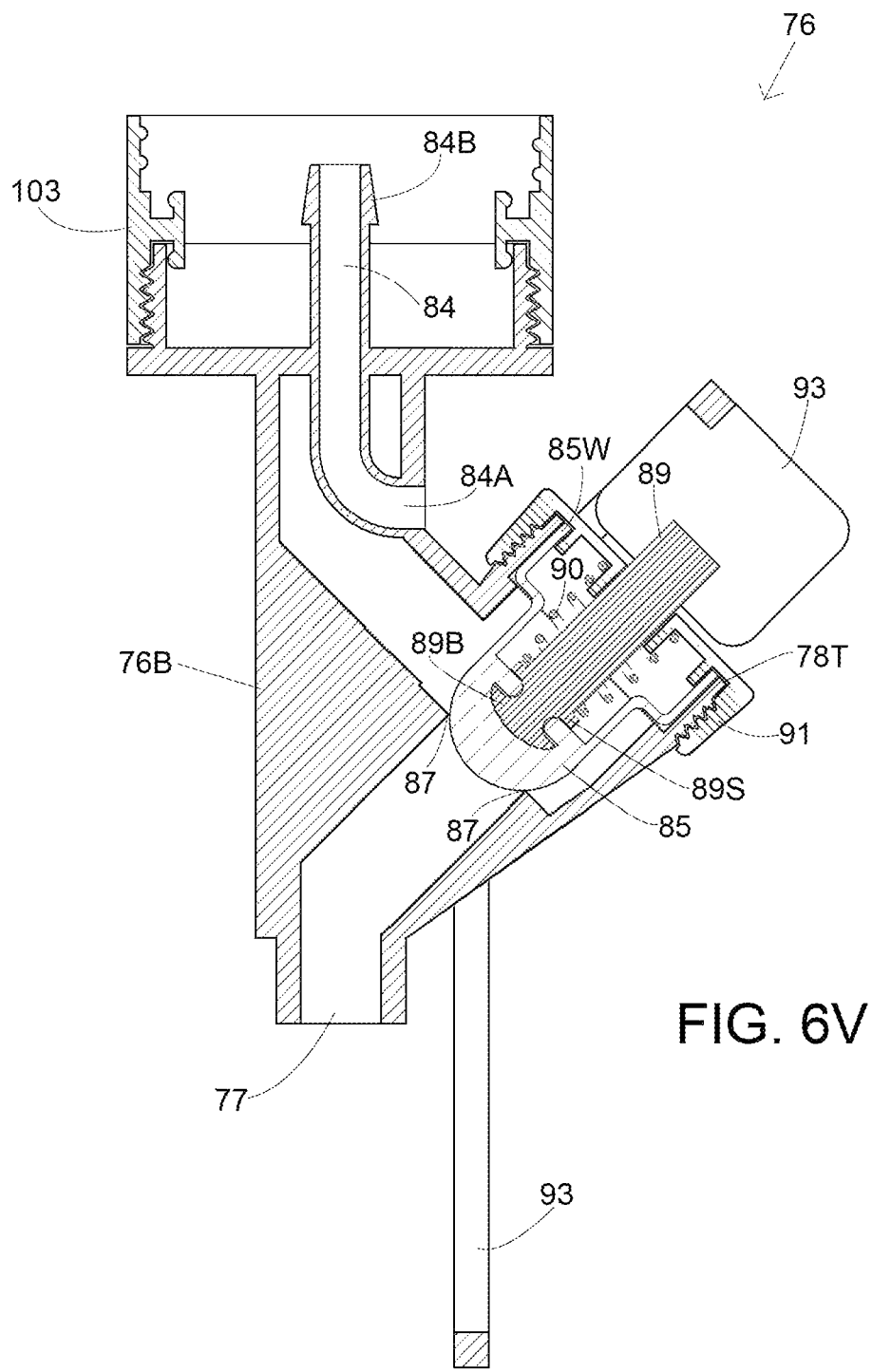

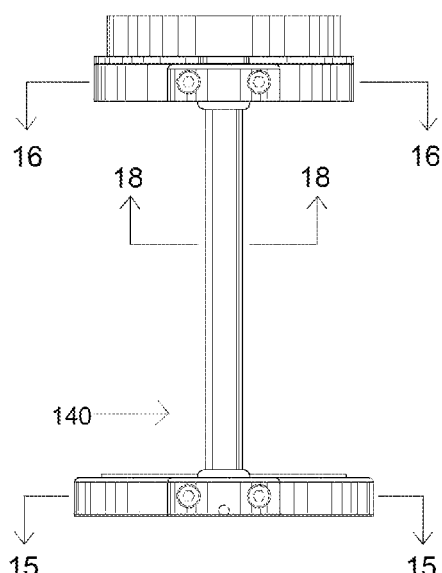
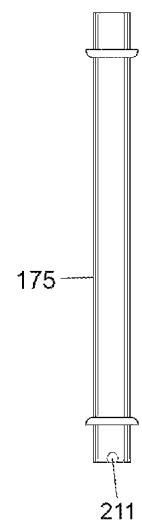
FIG. 13
FIG. 14
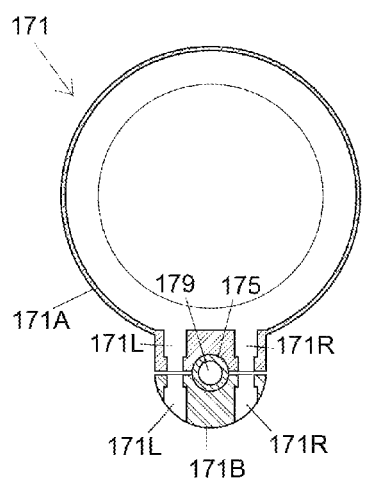
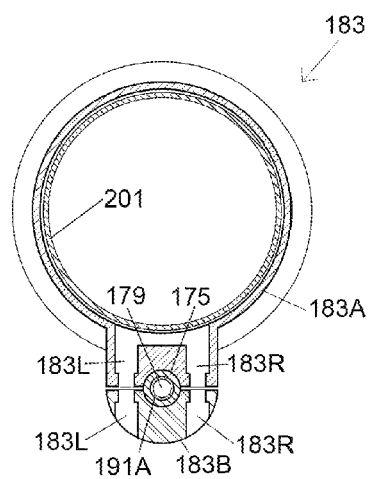
FIG. 15
FIG. 16

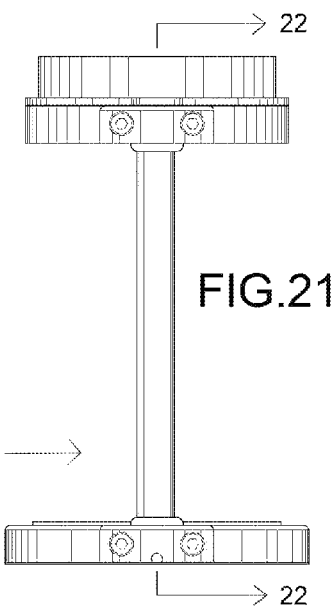
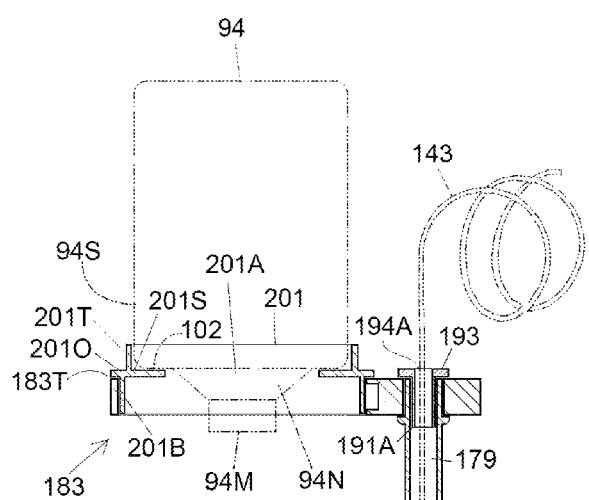
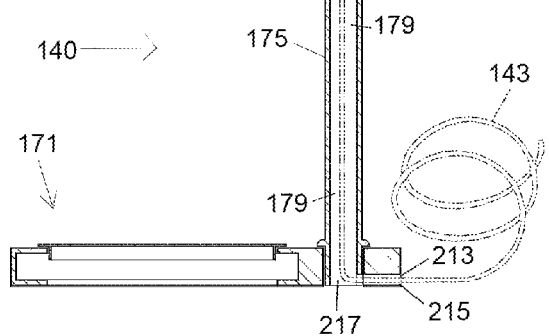

DESKTOP WATER BOTTLE DISPENSER

CROSS REFERENCE TO RELATED APPLICATIONS

This is a continuation-in-part of application Ser. No. 15/047,208 filed on 2016 Feb. 18, entitled "DESKTOP WATER BOTTLE DISPENSER" in the name of Kenneth J. Gallagher, and which is incorporated herein by reference in its entirety.

BACKGROUND OF THE DISCLOSURE

The present application generally relates to a bottled water dispenser, and, more particularly, to water bottle holders and water bottle dispensers that provide a convenient and simplified mechanism to access bottled water in a direct manner.

With the advent of increased popularity of bottled spring water and bottled purified water here and abroad, a need may have developed for water bottle holders and water bottle dispensers that may provide a convenient and simplified mechanism to access bottled water. In the past, water may have been dispensed through a water crock or similar devices. Water crocks may be jars or containers that store water. A dispensing device may be located at the bottom of the water crock for releasing water stored within the container. Water crocks generally require filling prior to usage and generally need to be cleaned periodically. Water dispensers have evolved from the simple water crocks to bottled water dispensers ranging from the original multiple gallon glass jugs that were inverted and positioned within large free standing and often refrigerated water coolers to the more current, disposable plastic bottles and single use "gallon" plastic water jugs.

A limited number of companies may offer purified and spring water in countertop plastic water jug dispensers. These plastic water jug dispensers may typically require that the dispensers lay flat on the countertop, and a single use valve may be located at the bottom of the jug. Of the few brands that may offer a countertop dispenser version of their product, several problems may be associated with their dispensers. To begin with, the user generally needs to administer a vent hole in these dispensers. Unfortunately, these plastic water jug dispensers generally do not provide a piercing tool for this task. Furthermore, the single use valves that may be offered with the small number of branded countertop dispensers on the market may be of a low quality and may often leak. Lastly, these dispensers may present a number of practical placement and use restrictions and problems.

Over the years, a variety of U.S. patents have issued on dispensing valves/valve parts, and water dispensing devices. U.S. Pat. No. 4,293,082 issued to Shinji Matsueda shows one way in which an inverted bottle can be supported by a stand that includes a thermal insulator for the inverted bottle. U.S. Pat. No. 5,123,720 issued to Blomster et al. discloses a floor based inverted water bottle stand for a 5 gallons bottle. As with the Shinji patent, Bolomster et al. is patenting the stand that supports an inverted bottle. U.S. Pat. No. 5,647,416 issued to Desrosiers et al. discloses another patent on a stand for a 5 gallons bottle that includes a reservoir and the support housing for the reservoir.

U.S. Pat. No. 6,241,126 issued to Andrew Goodman discloses a personal beverage desktop dispenser with a cubical base and valve housed therein. The male bottle threads are mated with the female threads of the base. An issue with this embodiment is that it may be difficult to invert the entire dispenser to union it with the upright bottle since the bottle valve is secured to the base. Even if the valve was not secured to the base, the valve with the handle is too large to fit through the bottle hole in the base top. It could prove rather difficult to threadably secure an entire base onto a bottle. Moreover, the base could become unsanitary rather quickly having liquid spilled within the base and it appears to be rather difficult to clean.

U.S. Pat. No. 6,527,145 issued to Jules G. Bennett, Jr. discloses a personal desktop beverage dispenser that has a base holding an inverted bottle with the male threads of the bottle threadably secured to the female threads of the dispenser base. An outflow valve controls the flow of bottle contents to a cup placed beneath. While this embodiment can be used with more than one bottle size it requires having to invert the entire base and threadably secure it onto an upright bottle, which could prove to be rather difficult.

U.S. Pat. No. 6,892,903 issued to Salvatore Barolotta discloses a personal beverage bottle dispenser. The personal beverage bottle dispenser requires that the entire base be inverted and threadably secured to the upright bottle in order to union the bottle with the valve.

U.S. Pat. No. 3,104,089 issued to Harold O. Seltsam, shows a self-closing lift type faucet adapted for use with water crocks, certain coolers, and beverage dispensers. Similarly, U.S. Pat. No. 3,207,472 issued Sep. 25, 1965 to Seltsam shows a tubular diaphragm valve. As with the self-closing valve, this valve is again configured for use with water crocks, certain coolers, and beverage dispensers.

SUMMARY OF THE DISCLOSURE

In accordance with one embodiment, a dispenser for delivering liquid from a supply bottle is disclosed. The dispenser has a base with a base foot. The base foot is attached to a tubular support. The tubular support extends vertically from the base foot. A rim is attached to the tubular support. The rim extends horizontally from the tubular support from a location above the base foot. The rim is vertically aligned with the base foot. A removable bottle collar engages with the rim. The removable bottle collar is adapted to engage and support the supply bottle inverted and positioned within the rim. The removable bottle collar has a center aperture where a mouth of the supply bottle extends there through. A top enclosure of the bottle collar is formed to engage the supply bottle. The top enclosure surrounds a portion of the supply bottle and restricts a lateral movement of the supply bottle inverted and positioned therein. A bottle seat of the bottle collar merges with the top enclosure and is formed to removably engage the supply bottle. The bottle seat has the center aperture where the mouth of the supply bottle extends there through when the supply bottle is inverted and positioned thereon. An outer portion of the bottle collar merges with the bottle seat. The outer portion of the bottle collar formed to be removably engaged upon the rim.

In accordance with one embodiment a dispenser for delivering a liquid from an inverted supply is disclosed. The dispenser has a dispenser valve. An inlet port of the dispenser valve is formed in a valve body of the dispenser valve. The inlet port is coupled to a mouth of the inverted supply bottle. An outlet port is formed directly below the inlet port of the valve body of the dispenser valve. The outlet port is in liquid communication with the inlet port. A sealing seat is formed in the valve body of the dispenser valve. The sealing seat is in liquid communication with the inlet and outlet ports. A slanted component compartment is formed the valve body of the dispenser valve. The component compartment has a threaded top. A component compartment bonnet has a center aperture. The component compartment bonnet is threadably secured to the component compartment top. A seat cup is contiguous with the component compartment bonnet and is housed within the component compartment. The seat cup controls a flow of the liquid through the dispenser valve. The liquid flowing through the dispenser valve is halted when the seat cup is urged upon the sealing seat. A peg is housed within the component compartment. A base of the peg is anchored within the seat cup. A slotted end of the peg extends through the aperture in the component compartment bonnet. A coil spring surrounds the peg. The coil spring is housed within the component compartment bonnet and contiguous with a spring base of the peg and the component compartment bonnet. The coil spring urges the seat cup against the sealing seat thus halting the flow of the liquid through the dispenser valve when the dispenser valve is not in use. A valve activation lever is attached to the slotted end of the peg. The valve activation lever has a horizontal bar formed below and to the side of the outlet port of the dispenser valve. The valve activation lever pulls the peg further through the component compartment bonnet when the valve activation lever is forced away from the outlet port of the dispenser valve. When the valve activation lever is forced away from the outlet port of the dispenser valve the coil spring is compressed and the seat cup is pulled away from the sealing seat of the valve body enabling the liquid from the inverted supply bottle to flow through the dispenser valve. A union attaches the inlet port of the inverted supply bottle to the mouth of the inverted supply bottle.

In accordance with one embodiment, a dispenser for delivering liquid from a supply bottle is disclosed. The dispenser has a wall-less base having a rim. A removable bottle collar engages with the rim. The removable bottle collar is adapted to engage and support the supply bottle inverted and positioned within the rim. The removable bottle collar has a center aperture where a mouth of the supply bottle extends there through. A top enclosure of the bottle collar is formed to engage the supply bottle. The top enclosure surrounds a portion of the supply bottle and restricts a lateral movement of the supply bottle inverted and positioned therein. A bottle seat of the bottle collar merges with the top enclosure and is formed to removably engage the supply bottle. The bottle seat has the center aperture where the mouth of the supply bottle extends there through when the supply bottle is inverted and positioned thereon. An outer portion of the bottle collar merges with the bottle seat. The outer portion of the bottle collar formed to be removably engaged upon the rim.

In accordance with one embodiment, is dispenser for delivering a liquid from a supply bottle is disclosed. The dispenser has a wall-less base having a rim. A piercing tool used for administering a vent hole in the supply bottle is engaged to the wall-less base.

BRIEF DESCRIPTION OF THE DRAWINGS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a mode of use, further objectives and advantages thereof, will be best understood by reference to the following detailed description of illustrative embodiments when read in conjunction with the accompanying drawings, wherein:

FIG. 6V is a sectional view of the exemplary vented bottle dispenser valve shown in FIG. 5V taken at the sectioning plane in the direction indicated by section lines 6V-6V in accordance with one aspect of the present application;

FIG. 13 is an orthogonal rear view of an exemplary dispenser base in accordance with one aspect of the present application;

FIG. 14 is an orthogonal rear view of an exemplary tubular support of the exemplary dispenser base;

FIG. 15 is a sectional view of the exemplary dispenser base of FIG. 13 taken at the sectioning plane in the direction indicated by section lines 15-15 in accordance with one aspect of the present application;

FIG. 16 is a sectional view of the exemplary dispenser rim of FIG. 13 taken at the sectioning plane in the direction indicated by section lines 16-16 in accordance with one aspect of the present application;

FIG. 21 is an orthogonal rear view of the exemplary dispenser base in accordance with one aspect of the presentation;

FIG. 22 is a sectional view of the exemplary dispenser base of FIG. 21 taken at the sectioning plane in the direction indicated by section lines 22-22, and an exemplary water bottle in accordance with one aspect of the present application;

DETAILED DESCRIPTION OF THE DISCLOSURE

Figure 1:
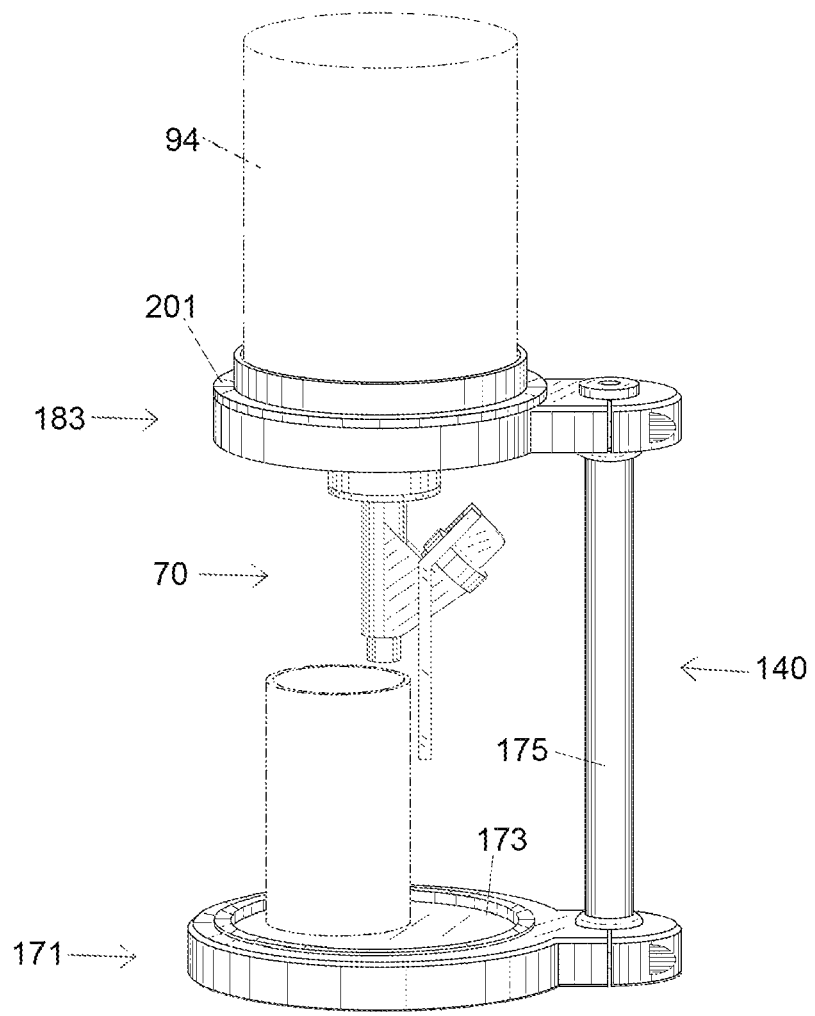
FIG. 1 is a perspective side view of an exemplary water bottle dispenser in accordance with one aspect of the present application.

The description set forth below in connection with the appended drawings is intended as a description of the present embodiments of the disclosure and is not intended to represent the forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that also are intended to be encompassed within the spirit and scope of this disclosure.

Accordingly, there are one or more aspects to the present water bottle dispenser that offers advantages over the current existing methods that are being used to serve people water. Embodiments of the disclosure provide a water bottle dispenser that may allow water to be accessed directly from single use water bottles for use with the water bottle dispenser, with no transfer of water to a container required.

In accordance with one embodiment, the dispenser may provide a removable dispenser valve. The dispenser valve may be threadably coupled to an upright water bottle. The installation of the dispenser valve onto the upright water bottle may be simple as only the valve is required to be coupled to the water bottle. The dispenser valve may control a flow of water from the water bottle. The dispenser valve may have an outlet port that is vertically aligned with an inlet port of the dispenser valve, and may enable a liquid from a supply bottle to be discharged directly below a mouth of an inverted supply bottle. In accordance with one In accordance with one embodiment, the dispenser valve may provide a removable vented dispenser valve. The vented dispenser valve may have a vent tube in a valve body of the dispenser valve, and the vent tube may begin at a vent tube inlet port in the valve body. The vent tube of the vented dispenser valve may have a barbed vent tube outlet port that may couple to a tube, and the tube may couple to a check valve. The vented dispenser valve generally does not require a vent hole to be formed in the water bottle, and may allow for the inverted water bottle to be turned up upright and placed in a refrigerator if needed.

In accordance with one embodiment, the water bottle dispenser may reduce the problem of not having a tool to administer a vent hole in a water bottle. The water bottle dispenser may provide a retaining device attached to the water bottle dispenser. A piercing tool for administering the vent hole the water bottle may be stored in a threaded cylinder of the retaining device. Once the vent hole is administered in the water bottle, the piercing tool may be placed back in the threaded cylinder where it stored, so that it is available for use to vent the next water bottle that may be used with the water bottle dispenser. Additionally, a bottle cap of the water bottle may be threadably secured to the threaded cylinder of the retaining device. Thus the retaining device may serve as a retainer for the bottle cap of the water bottle that is used with the water bottle dispenser, and may prevent the bottle cap from being lost.

In accordance with one embodiment the dispenser may provide a support device. The support device may support a piercing tool that may be magnetically engaged to the support device. The piercing tool may quickly be accessed to administer a vent hole the water bottle. Once a vent hole is administered in the water bottle, the piercing tool may be placed back on the support device where it is magnetically engaged thereto, so that the piercing tool is available for use to vent the next water bottle that may be used with the water bottle dispenser.

In accordance with one embodiment, a fixture stem may engage the dispenser base and extend vertically therefrom. A light fixture may have an illumination source, and may be attached to the fixture stem. A source of electrical power in communication with the illumination source may be provided. The light fixture may act as a nightlight in addition to illuminating the water bottle and may facilitate usage of the dispenser in a dark environment. In accordance with one embodiment, a self-powered light may be attached to the fixture stem that may enable cordless illumination of the water bottle of the dispenser base. In accordance with another embodiment, a hook may be attached to the fixture stem and may enable a self-powered light to be suspended from the hook as another cordless source of illumination.

The dispenser valve may be an improvement over the "one-off" dispenser valves that are commonly used with countertop dispensers, so the quality and life of the dispenser valve may be better, and the dispenser valve may be less likely to leak. The above advantages of one or more aspects of the water bottle dispenser will become apparent upon reflection of the disclosure set forth below.

Referring to FIG. 1 a perspective side view of a water bottle dispenser (hereinafter dispenser) is shown. The dispenser may have a wall-less tubular base 140 (hereinafter dispenser base 140). In the present embodiment a portion of a base foot 171, and a portion of a rim 183 of the dispenser base 140 may be circular in shape. However only one example is illustrated, and the base foot 171 and the rim 183 may be offered in a variety of different shapes, sizes and configurations without departing from the spirit and scope of the present embodiment. The base foot 171 may have the receiving disc 173, however the base foot 171 may be formed without the receiving disc 173. As shown in FIG. 1, a tubular support 175 may be round. As with the base foot 171 and the rim 183, the tubular support 175 may also be offered in shapes and sizes other than illustrated. The dispenser base 140 may have a removable bottle collar 201 (hereinafter bottle collar 201). The dispenser base 140 and the bottle collar 201 may be constructed of a metal, or a combination of a metal and a durable plastic such as polypropylene. The bottle collar 201 may be removably engaged upon the rim 183. The bottle collar 201 may be used to engage and support a water supply bottle 94 (hereinafter supply bottle 94) inverted and positioned within the rim 183 of the dispenser base 140. A dispenser valve 70 may be coupled to the supply bottle 94. The dispenser valve 70 may control a flow of water (hereinafter liquid) from the supply bottle 94.

Figures 2, 2V:
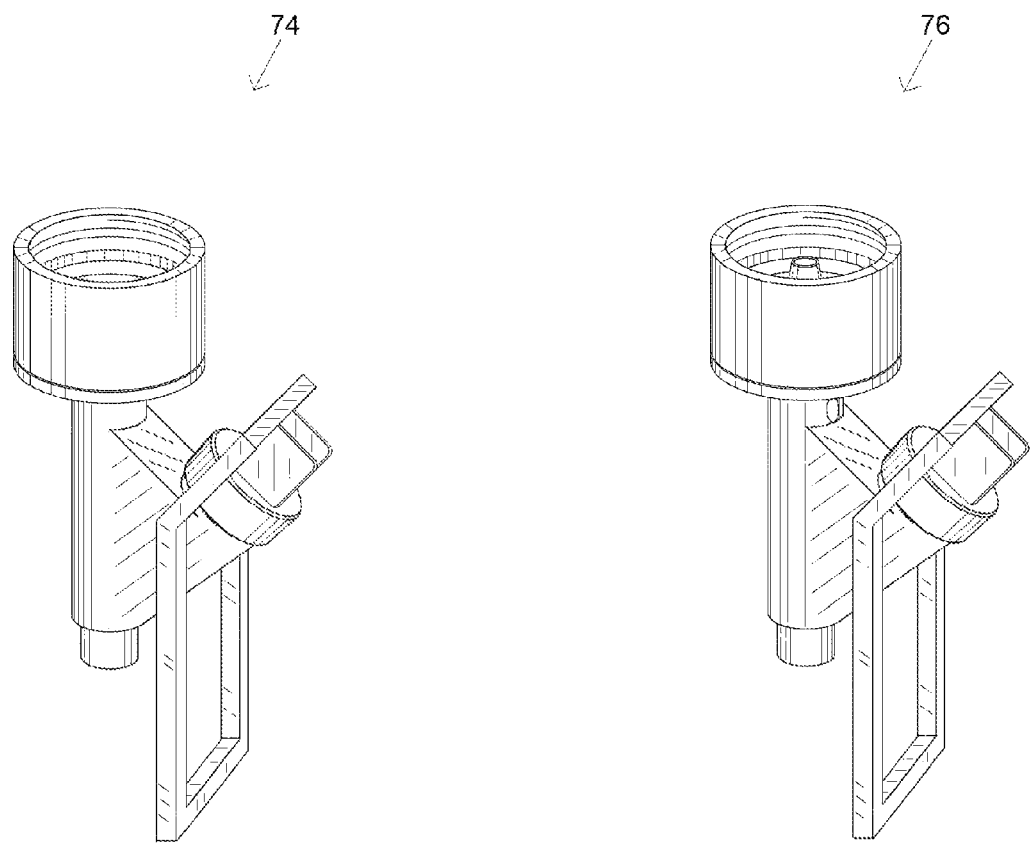
FIG. 2 is a perspective side view of an exemplary bottle dispenser valve used with the exemplary water bottle dispenser in accordance with one aspect of the present application.
FIG. 2V is a perspective side view of an exemplary vented bottle dispenser valve used with the exemplary water bottle dispenser in accordance with one aspect of the present application.
Figure 3:
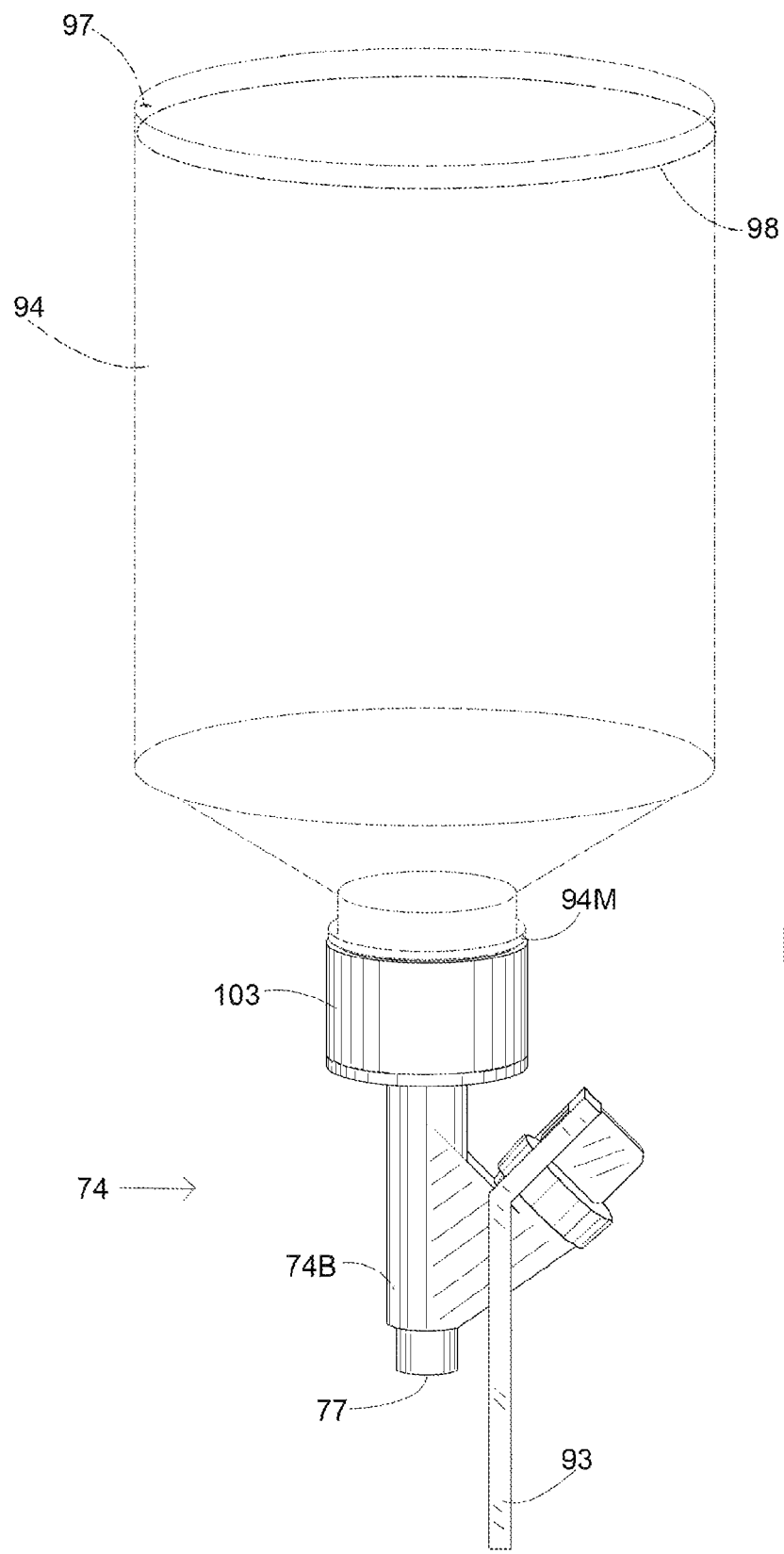
FIG. 3 is a perspective side view of the exemplary bottle dispenser valve depicted in FIG. 2 connected to a water bottle in accordance with one aspect of the present application.

Referring to FIGS. 2 and 3, the dispenser valve 70 of FIG. 1 may be a vertical dispenser valve 74. In accordance with one embodiment the dispenser valve 74 is a removable vertical dispenser valve (hereinafter dispenser valve 74). As may be shown in FIG. 3, the dispenser valve 74 may be removably coupled to a mouth 94M of the supply bottle 94 with a bottle union 103. The dispenser valve 74 may control a flow of a liquid from the supply bottle 94. The dispenser valve 74 is generally not vented, and may require that prior to usage, a vent hole 97 be administered to the supply bottle 94 in order for liquid to flow adequately through dispenser valve 74 and out of a valve body outlet port 77 (hereinafter outlet port 77) when a valve activation lever 93 is activated.

Figure 3V:
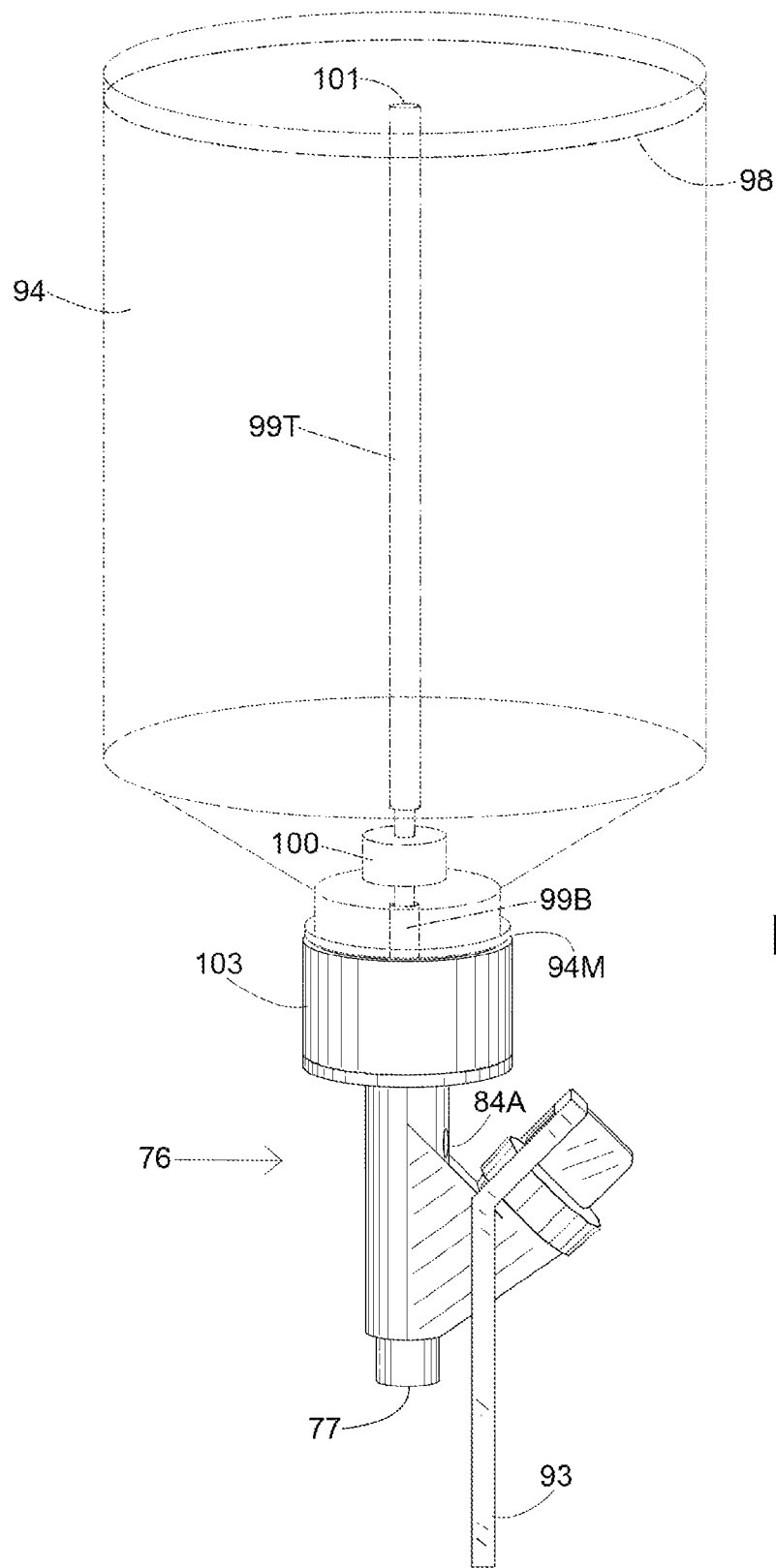
FIG. 3V is a perspective side view of the exemplary vented bottle dispenser valve depicted in FIG. 2V connected to a water bottle in accordance with one aspect of the present application.

Referring to FIGS. 2V and 3V, the dispenser valve 70 of FIG. 1 may be a vented vertical dispenser valve 76 (hereinafter dispenser valve 76). In accordance with one embodiment, the dispenser valve 76 is a removable dispenser valve. As may be shown in FIG. 3V, the dispenser valve 76 may be removably coupled to the mouth 94M of the supply bottle 94 with the bottle union 103. The dispenser valve 76 may control the flow of the liquid from the supply bottle 94. The dispenser valve 76 may be used with a check valve 100.

When using the dispenser valve 76, a vent hole may not be required in supply bottle 94. Air may enter the dispenser valve 76 through a vent tube inlet port 84A. The air may then enter a bottom tube 99B and flow through a check valve 100, and exit a top tube 99T into the supply bottle 94 through a tube outlet 101. The check valve 100 may function quietly as long as a liquid level 98 of the supply bottle 94 is below a tube outlet 101 of the top tube 99T as this may prevent liquid from entering the check valve 100. It should be noted that the dispenser valve 76 might operate without the tube 99T. However, if the tube 99T is used, the dispenser valve 76 may operate more quietly. When the valve activation lever 93 is activated, the liquid may flow through the dispenser valve 76 and exit at the outlet port 77. Any bottle used with the dispenser valve 76 may be removed from the dispenser at any time, turned upright, and placed back in a refrigerator if needed.

Figure 4:
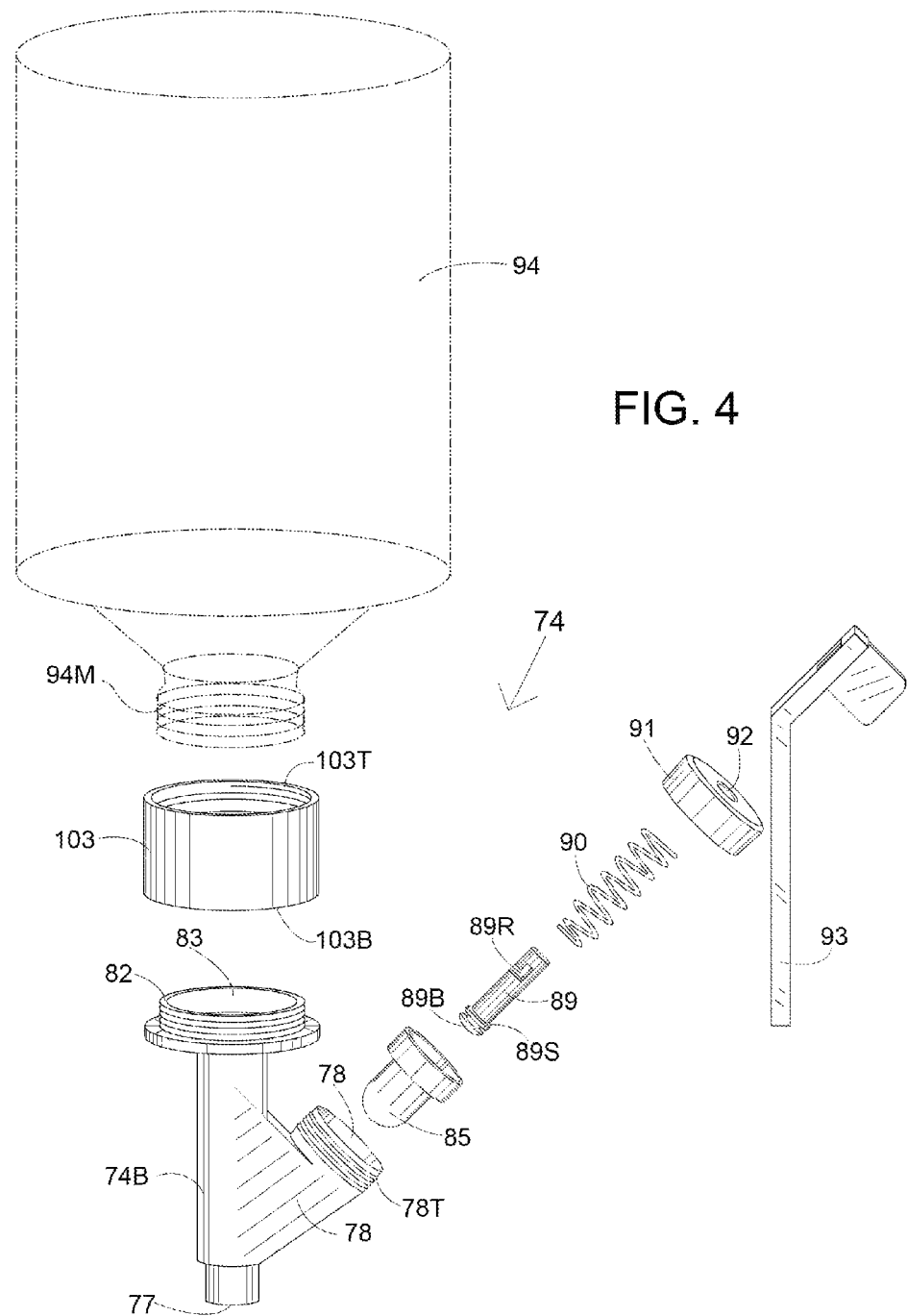
FIG. 4 is an exploded view of the exemplary bottle dispenser valve connected to a water bottle of FIG. 3 in accordance with one aspect of the present application.

Referring to FIG. 4, and an exploded view of FIG. 3 may be seen. In FIG. 4 the supply bottle 94 and the dispenser valve 74 are illustrated. A union bottom 103B of the bottle union 103 may be threadably secured to a valve body inlet port top 82, and the bottle mouth 94M of the supply bottle 94 may be threadably secured to a bottle union top 103T of bottle union 103. A valve body inlet port 83 (hereinafter inlet port 83) and the outlet port 77 may be formed in a valve body 74B, and may be in liquid communication with one another. The outlet port 77 of the valve body 74B may be formed directly below the inlet port 83 of the valve body 74B. The outlet port 77 may be in vertical alignment with the inlet port 83 of dispenser valve 74. The outlet port 77 may deliver the liquid from the inverted supply bottle 94 to a location directly below the mouth 94M of the inverted supply bottle 94. The slanted component compartment 78 that may be formed in the valve body 74B, a seat cup 85, and a peg base 89B of the peg 89 may be seen. The peg base 89B may anchor into the seat cup 85. A right pin slot 89R of the peg 89 may be seen. A coiled spring 90 may surround the peg 89 and may sit on a spring base 89S of the peg 89 when the dispenser valve 74 is assembled. A peg aperture 92 of a component compartment bonnet 91 may be seen. The component compartment bonnet 91 may force up against the coil spring 90 when dispenser valve 74 is fully assembled. The peg aperture 92 of the component compartment bonnet 91 may be where the peg 89 passes through component compartment bonnet 91 so that peg 89 can attach to the valve activation lever 93. The component compartment bonnet 91 may be threadably secured onto a threaded component compartment top 78T.

Figure 4V:
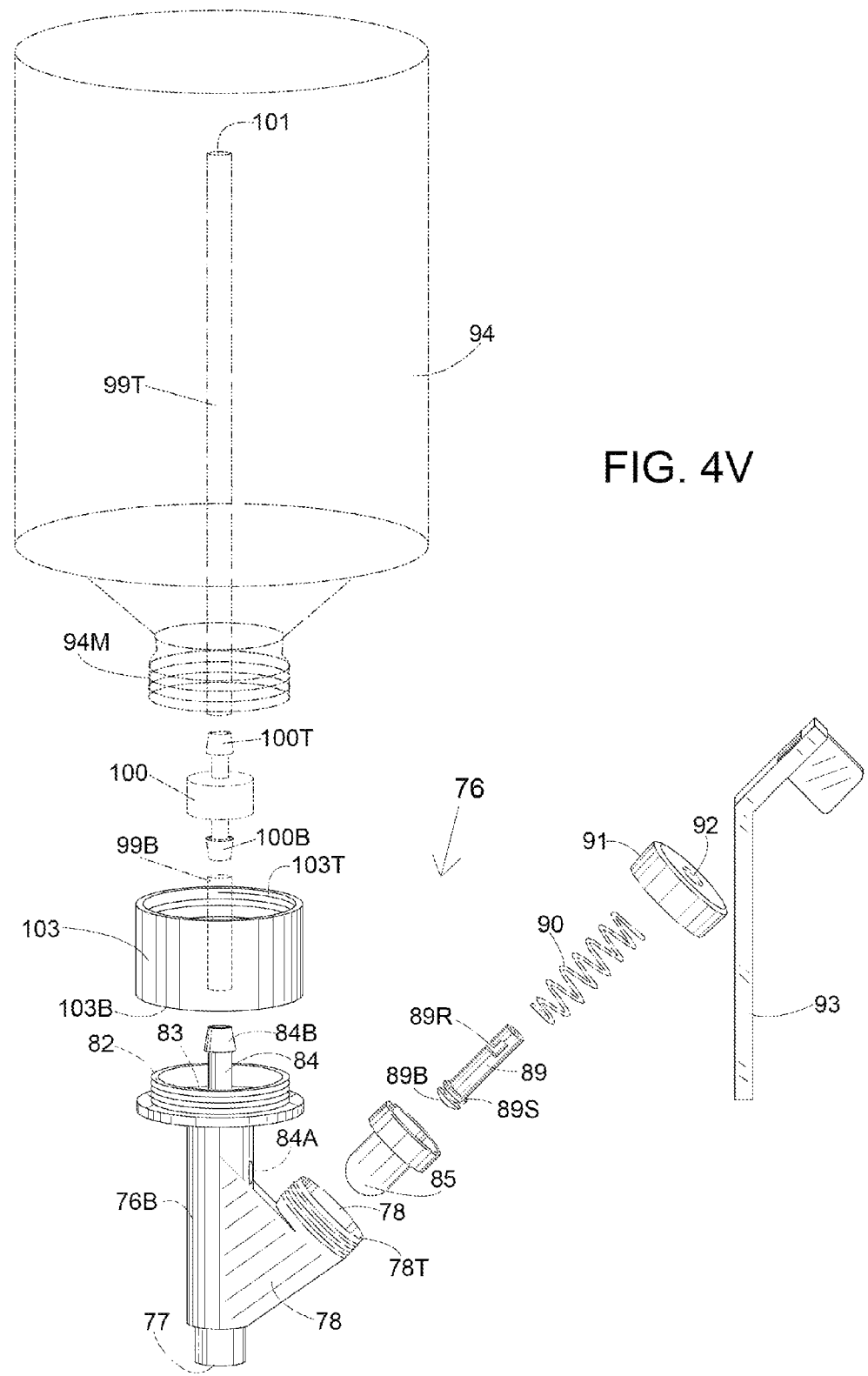
FIG. 4V is an exploded view of the exemplary vented bottle dispenser valve connected to a water bottle of FIG. 3V in accordance with one aspect of the present application.

Referring to FIG. 4V, an exploded view of FIG. 3V may be seen. In FIG. 4V, the supply bottle 94 and the dispenser valve 76 may be seen. The union bottom 103B of the bottle union 103 may be threadably secured to the threaded valve body inlet port top 82, and the bottle mouth 94M of the supply bottle 94 may be threadably secured to the union top 103T of the bottle union 103. The inlet port 83 may be in liquid communication with the valve body outlet port 77, and both may be formed in the valve body 76B. The outlet port 77 of the valve body 76B may be formed directly below the inlet port 83 of the valve body 76B. The outlet port 77 of the valve body 76B may be formed in vertical alignment with the inlet port 83 of the dispenser valve 76. The outlet port 77 may deliver the liquid from the inverted supply bottle 94 to a location directly below the mouth 94M of the inverted supply bottle 94. A vent tube inlet port 84A may be where air enters the valve body 76B, flows through the vent tube 84, and exits at a barbed vent tube outlet port 84B. The barbed vent tube outlet port 84B may couple to the tube 99B, and the tube 99B may couple to the check valve 100 at a bottom barbed inlet 100B. The tube 99T may couple to the check valve 100 at a top barbed inlet 100T. Additionally, when the dispenser valve 76 is fully assembled and coupled to supply bottle 94, air may enter the dispenser valve 76 at the vent tube inlet port 84A. Air may exit the tube 99T at the tube outlet 101, which may allow air to enter the supply bottle 94, and may allow liquid to flow freely from the outlet port 77 when the valve activation lever 93 is activated.

To the right of the valve body 76B may be the slanted component compartment 78 that may be formed in the valve body 76B, and the threaded component compartment top 78T. Located above the slanted component compartment 78 may be the seat cup 85, and the peg base 89B of the peg 89. The peg 89 may be anchored into the seat cup port 85. The coil spring 90 may surround the peg 89 and may sit on the spring base 89S of the peg 89 when the dispenser valve 76 is assembled. A right pin slot 89R of the peg 89 may be seen. The peg aperture 92 of the component compartment bonnet 91 may also be seen. The component compartment bonnet 91 may force up against the coil spring 90 when the dispenser valve 76 is fully assembled. The peg aperture 92 of the component compartment bonnet 91 may be where the peg 89 passes through the component compartment bonnet 91 so that the peg 89 may attach to the valve activation lever 93. The component compartment bonnet 91 may be threadably secured to the component compartment top 78T.

Figure 5:
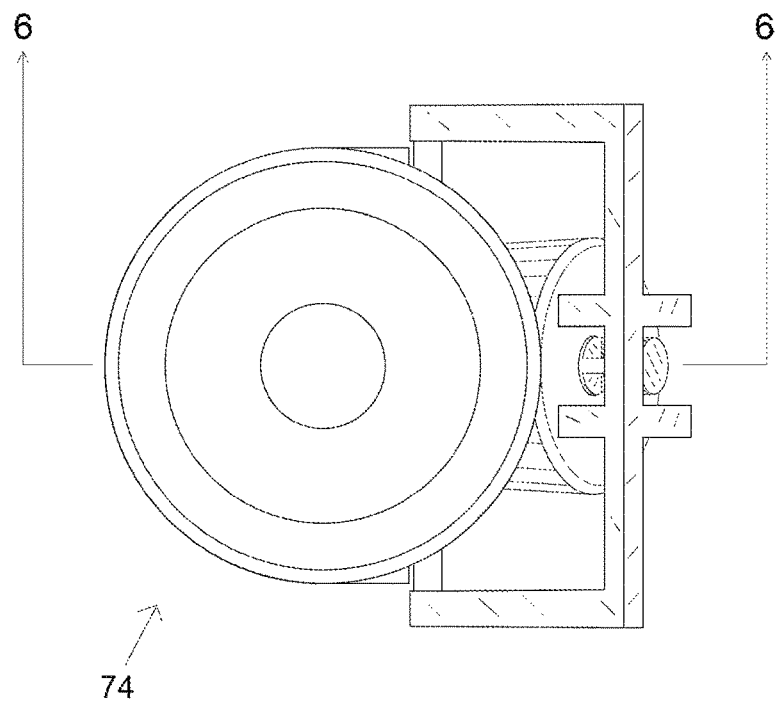
FIG. 5 is a top view of the exemplary bottle dispenser valve of FIG. 2 in accordance with one aspect of the present application.
Figure 6:
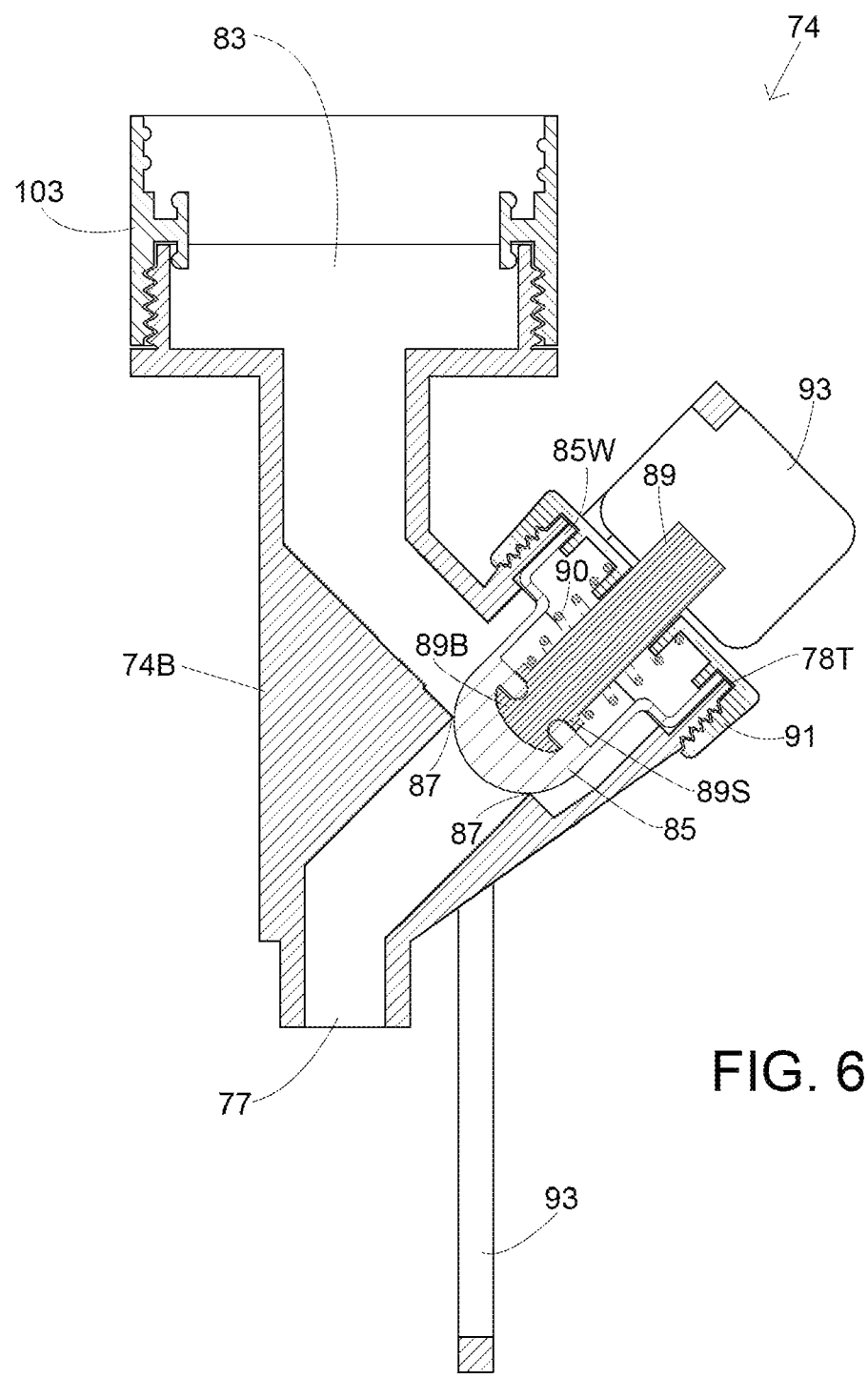
FIG. 6 is a sectional view of the exemplary bottle dispenser valve shown in FIG. 5 taken at the sectioning plane in the direction indicated by section lines 6-6 in accordance with one aspect of the present application.

Referring to FIGS. 5 and 6, wherein FIG. 5 is an orthogonal top view of the dispenser valve 74 of FIG. 2 and FIG. 6 is sectional view taken along section lines 6-6 of FIG. 5, the bottle union 103 may be attached to the dispenser valve 74. The valve activation lever 93 may move the peg base 89B, which may move the seat cup 85 upward by pulling the peg 89 further to the outside of the component compartment bonnet 91 when the valve activation lever 93 is activated. The coil spring 90 may rest on the spring base 89S of the peg 89, and urge up against the component compartment bonnet 91 which may urge the seat cup 85 downward against a sealing seat 87 when the valve activation lever 93 is in a resting position as may be seen. The sealing seat 87 may be formed in the valve body 74B, and may be in liquid communication with the inlet port 83, and the outlet port 77. The component compartment bonnet 91 may be contiguous with a seat cup wall 85W to prevent any liquid leakage, and may be threadably secured onto the component compartment top 78T. The outlet port 77 as described above may also be seen.

Figure 5V:
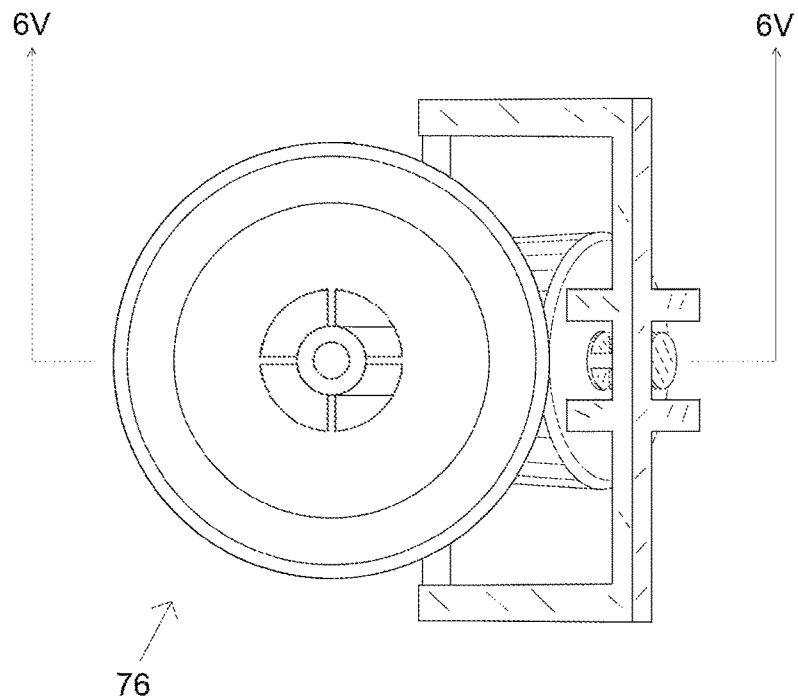
FIG. 5V is a top view of the exemplary vented bottle dispenser valve of FIG. 2V in accordance with one aspect of the present application.

Referring to FIGS. 5V and 6V, wherein FIG. 5V is an orthogonal top view of the dispenser valve 76 of FIG. 2V and FIG. 6V is sectional view taken along section lines 6V-6V of FIG. 5V, the bottle union 103 may be attached to the dispenser valve 76. Air may enter the vent tube 84 that begins at vent tube inlet port 84A, travel through the vent tube 84, and exit the barbed vent tube outlet port 84B. The valve activation lever 93 may move the peg base 89B when the valve activation lever 93 is activated. The peg base 89B may move the seat cup 85 upward by pulling the peg 89 further to the outside of component compartment bonnet 91. The coil spring 90 may rest on the spring base 89S of the peg 89, and urge up against the component compartment bonnet 91, which may urge the seat cup 85 downward against the sealing seat 87 when the valve activation lever 93 is in the resting position as may be seen. The sealing seat 87 may be formed in the valve body 76B, and may be in liquid communication with the inlet port 83, and the outlet port 77. The component compartment bonnet 91 may be contiguous with the seat cup wall 85W, and threadably secured onto the component compartment top 78T. The liquid may exit the dispenser valve 76 at outlet port 77 as shown.

Figure 7:
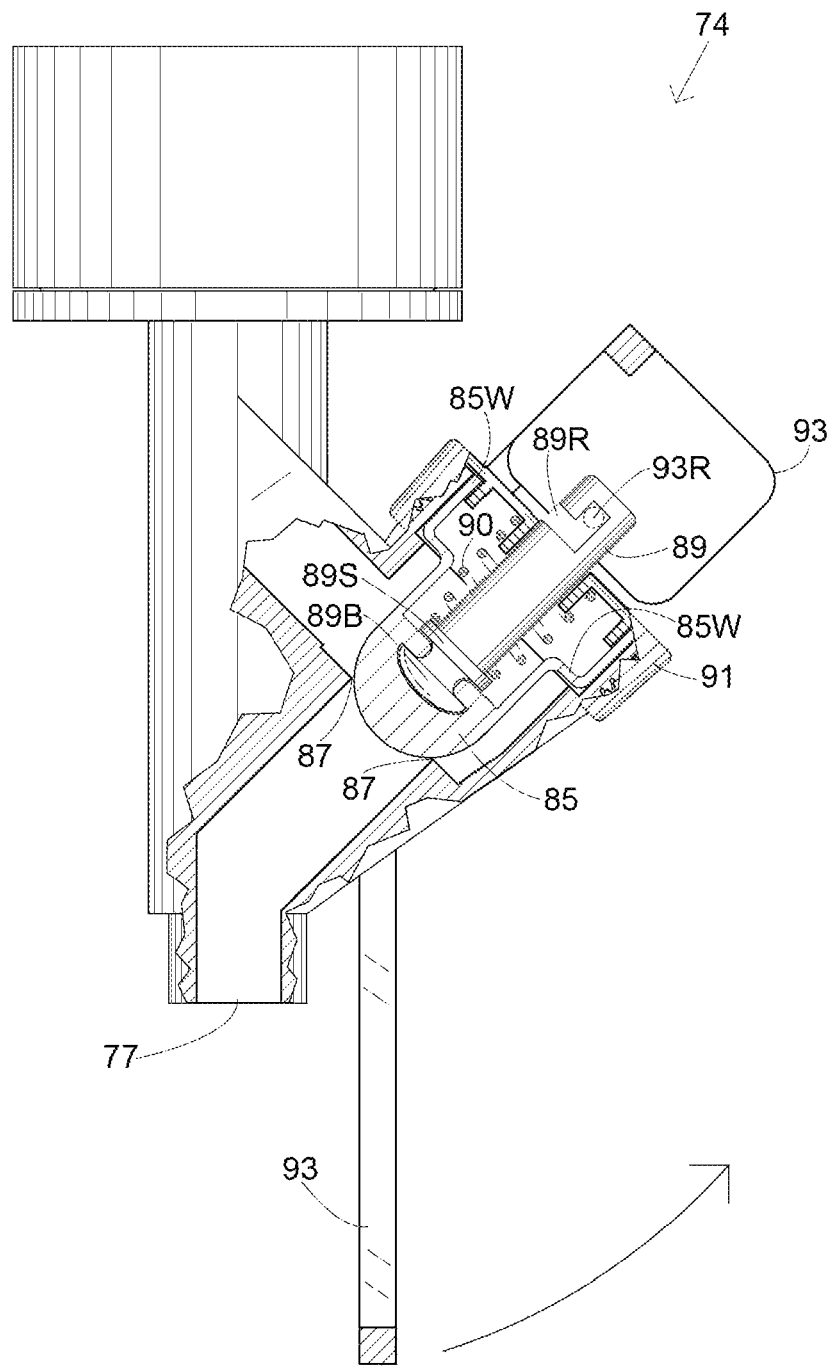
FIG. 7 is a broken orthogonal side view of the exemplary bottle dispenser valve of FIG. 2 in accordance with one aspect of the present application.

Referring to FIG. 7, the valve activation lever 93 of the dispenser valve 74 may be depicted in a resting position. When the valve activation lever 93 is resting, the seat cup 85 may be urged against the sealing seat 87, which may halt the flow of liquid from the supply bottle (not shown) from making its way through the outlet port 77. The coil spring 90 may push up against the component compartment bonnet 91 and the spring base 89S of the peg 89. With the seat cup 85 attached to the peg base 89B, the seat cup 85 may be urged against the sealing seat 87 which may halt the flow of liquid through the dispenser valve 74. Thus the seat cup wall 85W may be in a straight position. The right pin slot 89R may be where a right pin 93R of the valve activation lever 93 may engage with the peg 89.

Figure 7V:
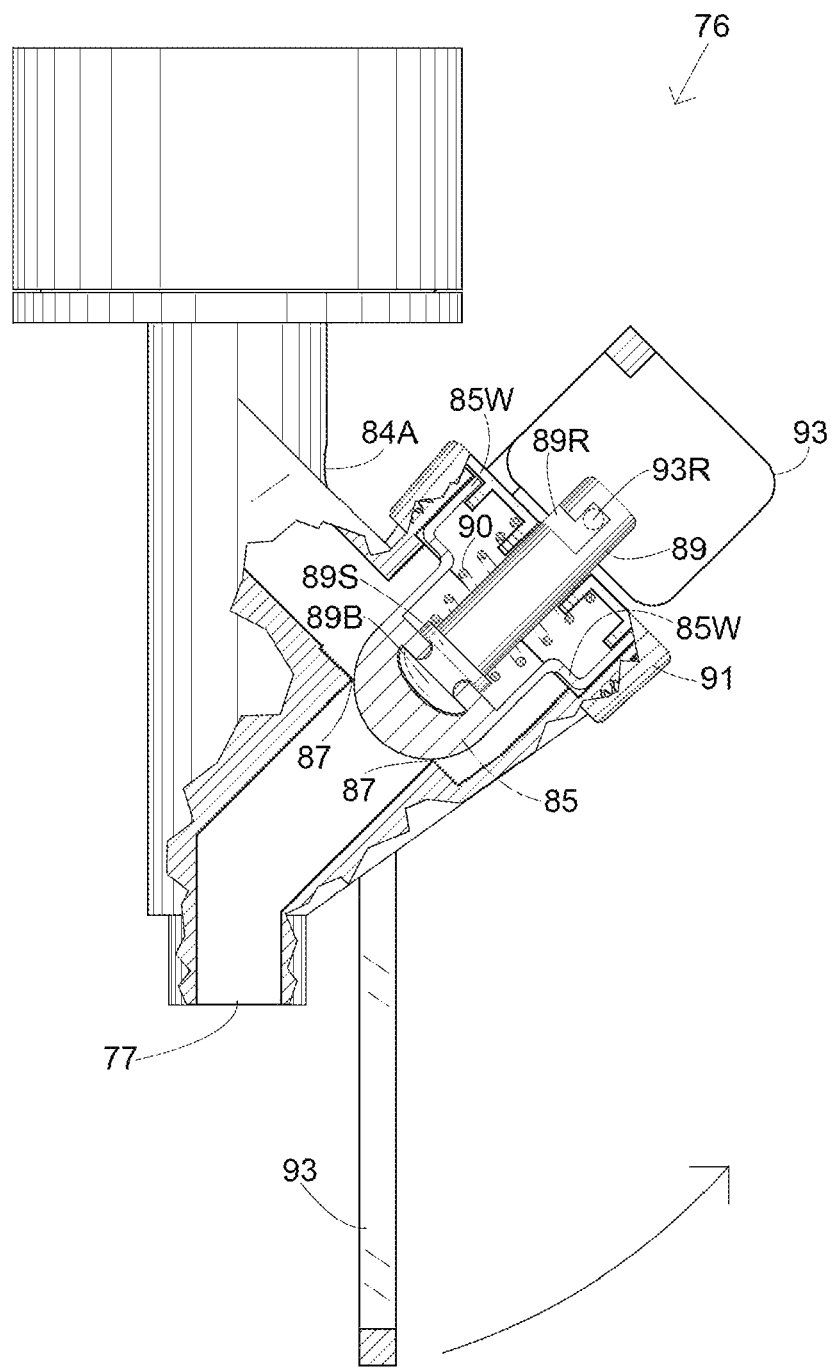
FIG. 7V is a broken orthogonal side view of the exemplary vented bottle dispenser valve of FIG. 2V in accordance with one aspect of the present application.

Referring to FIG. 7V, the workings of dispenser valve 76 may be similar to that of the dispenser valve 74 disclosed above with reference to FIG. 7 when the dispenser valve 76 is in resting position. As with the dispenser valve 74, when the valve activation lever 93 is resting, the seat cup 85 may be urged against the sealing seat 87, which may halt the liquid from making its way through the valve outlet port 77. Thus the seat cup wall 85W is in a straight position. The coil spring 90 may urge against the component compartment bonnet 91 and the spring base 89S of the peg 89, and with the seat cup 85 attached to the peg base 89B, the seat cup 85 may be urged against the sealing seat 87 which may halt the liquid from flowing through the dispenser valve 76. The right pin slot 89R may be where the right pin 93R of valve activation lever 93 may engage with the peg 89. The vent tube inlet port 84A of the valve 76 may also be seen in the present embodiment.

Figure 8:
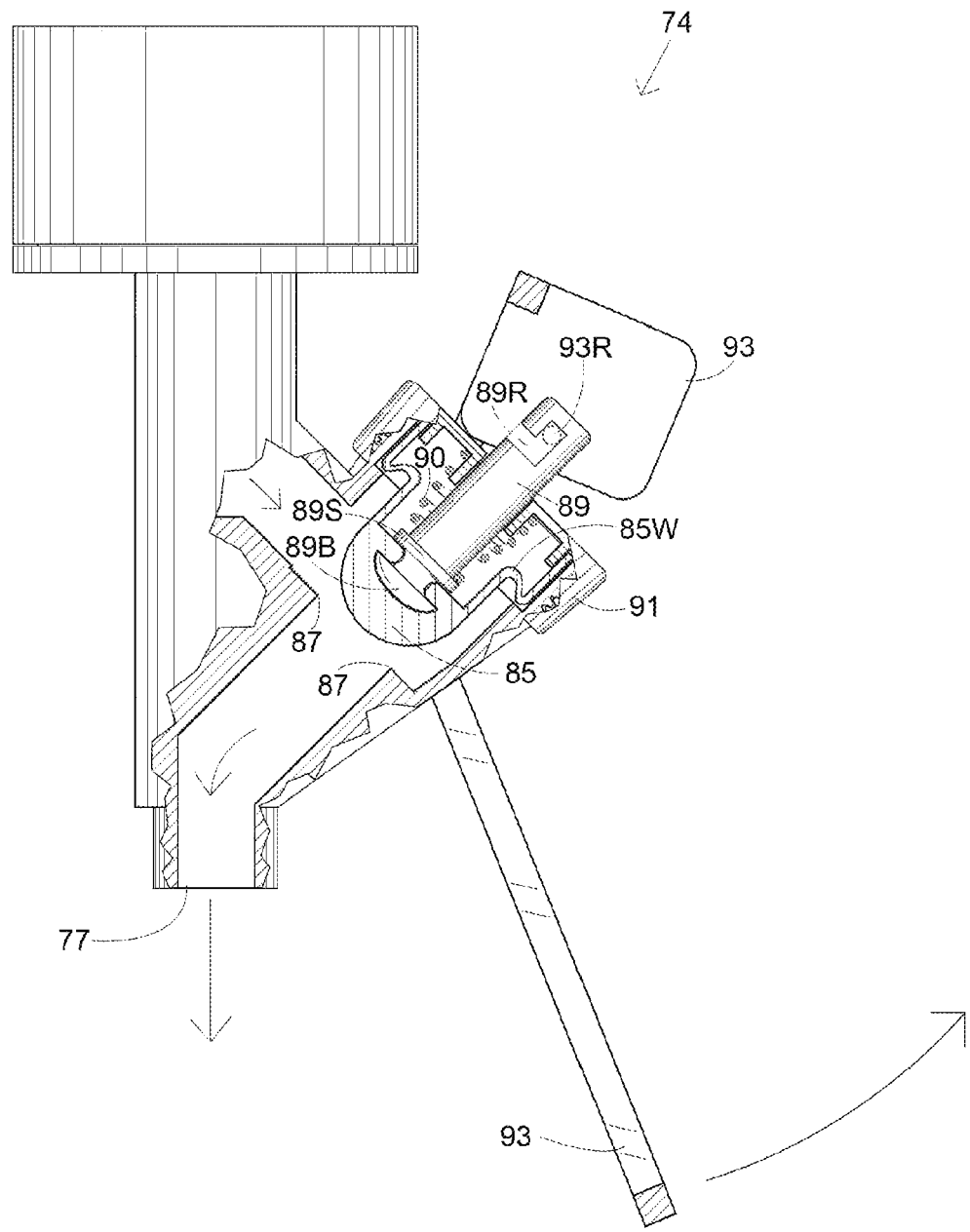
FIG. 8 is a broken orthogonal side view of the exemplary bottle dispenser valve of FIG. 2 in accordance with one aspect of the present application.

Referring to FIG. 8, the valve activation lever 93 of the dispenser valve 74 may be moved forward. When the valve activation lever 93 may be activated, the right pin 93R and a left pin 93L (see FIG. 10), of the valve activation lever 93, that are inserted into the right pin slot 89R and a left pin slot 89L (see FIG. 10) of peg 89, may pull the peg base 89B of the peg 89 upward. When the peg 89 moves upward, it may pull the seat cup 85 away from the sealing seat 87, and may compress the coil spring 90 up against the coiled spring base 89S of the peg 89 and the component compartment bonnet 91. The liquid from the supply bottle (not shown) may then flow through the dispenser valve 74 and may pass through the outlet port 77. Thus, the seat cup wall 85W may be in a flexed position.

Figure 8V:
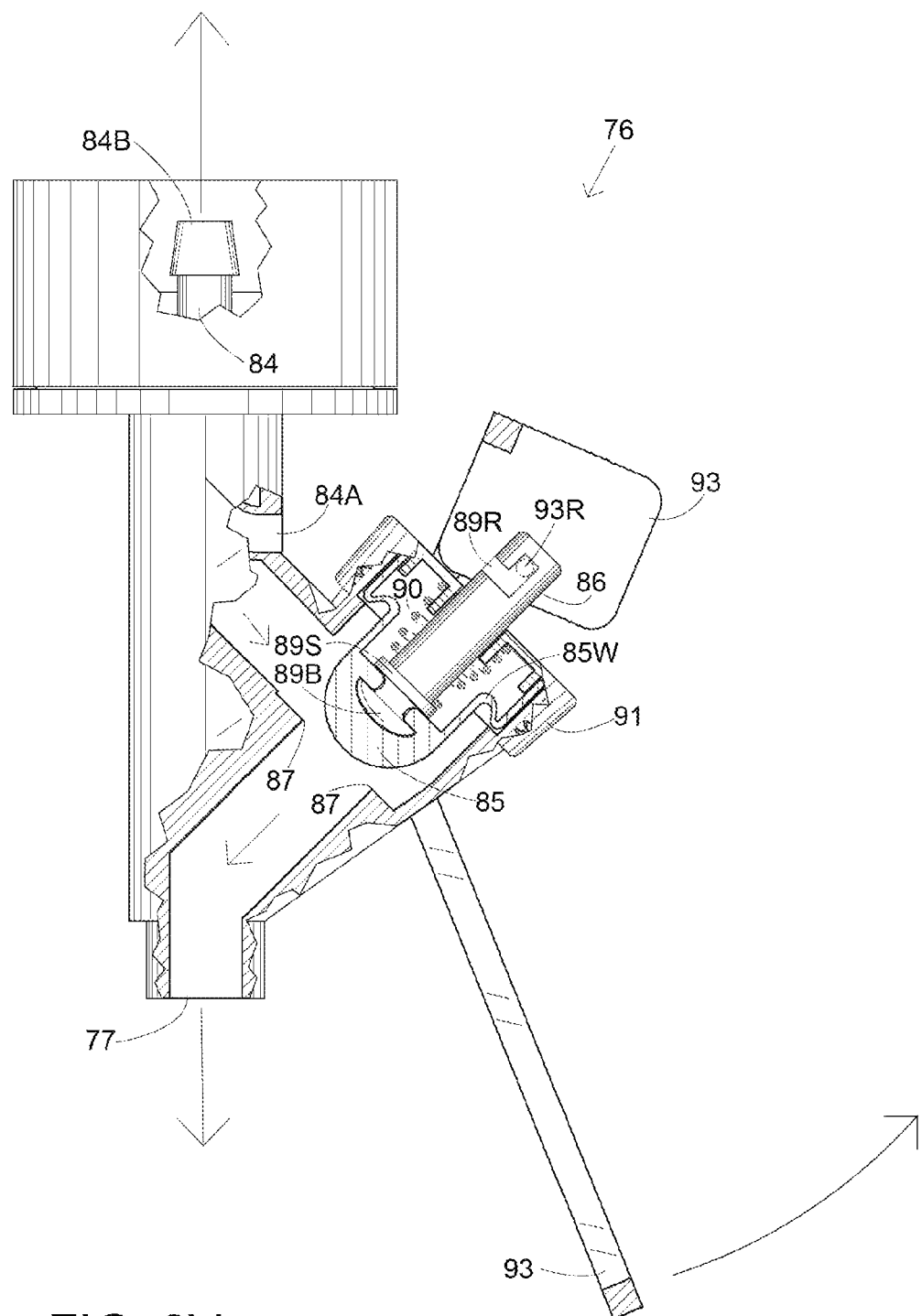
FIG. 8V is a broken orthogonal side view of the exemplary vented bottle dispenser valve of FIG. 2V in accordance with one aspect of the present application.

Referring to FIG. 8V, the valve activation lever 93 of the dispenser valve 76 may be seen moved forward. The operation is similar to the operation disclosed in FIG. 8. However, in this embodiment, the vent tube 84 may pull air into the supply bottle (not shown) that is in union with the dispenser valve 76. When the valve activation lever 93 is activated, the right and left pins 93R and 93L (see FIG. 10) of the valve activation lever 93, that are inserted into the right and left pin slots 89R and 89L (see FIG. 10) of peg 89, may pull the peg base 89B of the peg 89 upward. When the peg 89 moves upward, it may pull the seat cup 85 away from sealing seat 87 and may compress the coil spring 90 up against the peg coiled spring base 89S and the component compartment bonnet 91. Air may then flow into the vent tube inlet port 84A and through the barbed vent tube outlet port 84B. Thus when in use the liquid from the supple bottle (not shown) may then flow through the dispenser valve 76 and pass through the outlet port 77. Thus, the seat cup wall 85W may be in a flexed position.

Figure 9:
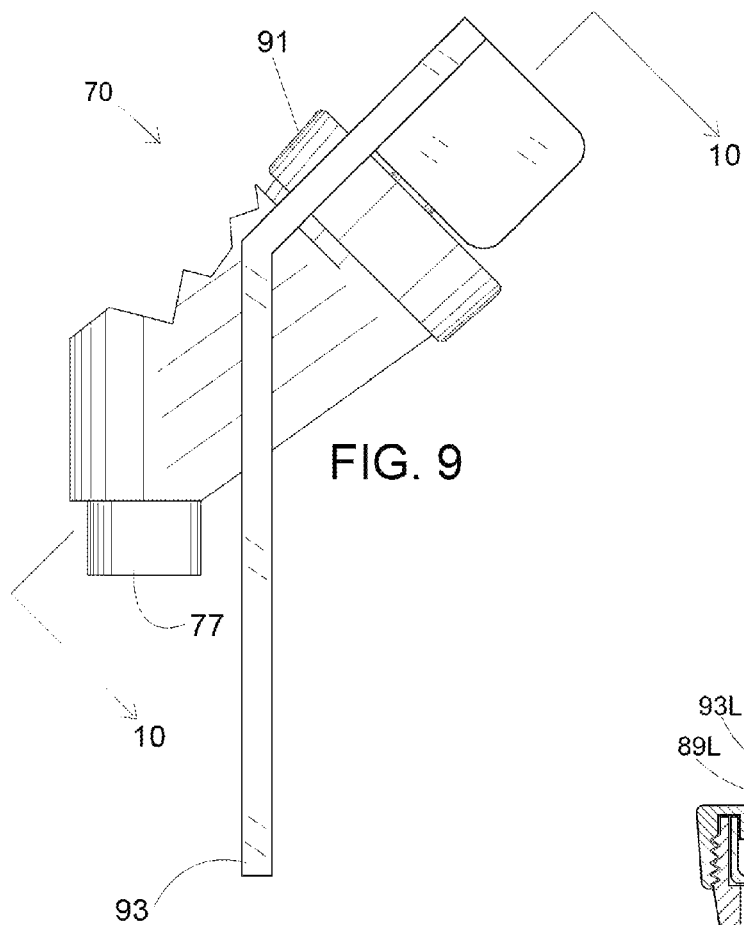
FIG. 9 is broken orthogonal side view illustrating exemplary bottle dispenser valve of FIG. 2 and the exemplary of vented bottle dispenser valve FIG. 2V in accordance with one aspect of the present application.
Figure 10:
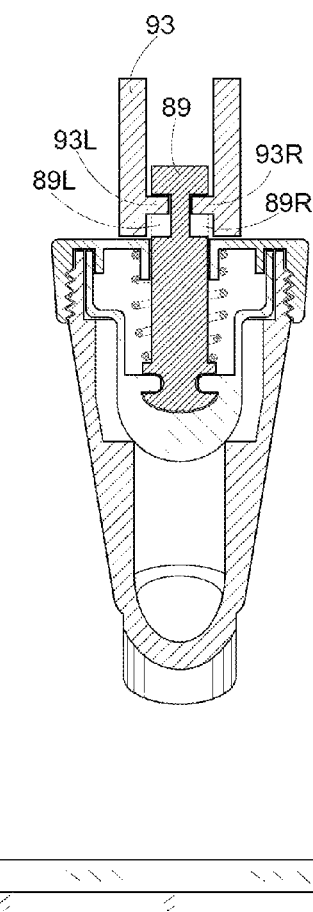
FIG. 10 is a sectional view of FIG. 9 taken at the sectioning plane in the direction indicated by section lines 10-10 in accordance with one aspect of the present application.

Referring to FIGS. 9 and 10, wherein FIG. 10 is a sectional view of FIG. 9 taken at the sectioning plane in the direction indicated by section lines 10-10, the component compartment bonnet 91, the valve activation lever 93, and the outlet port 77 of the dispenser valves depicted in FIGS. 2 and 2V may be shown. In FIG. 10, the right and left pins 93R and 93L of the valve activation lever 93 may be seen along with the right and left pin slots 89R and 89L of the peg 89, showing how the valve activation lever 93 may engage the peg 89 and may activate the dispenser valve in FIG. 9.

Figure 11:
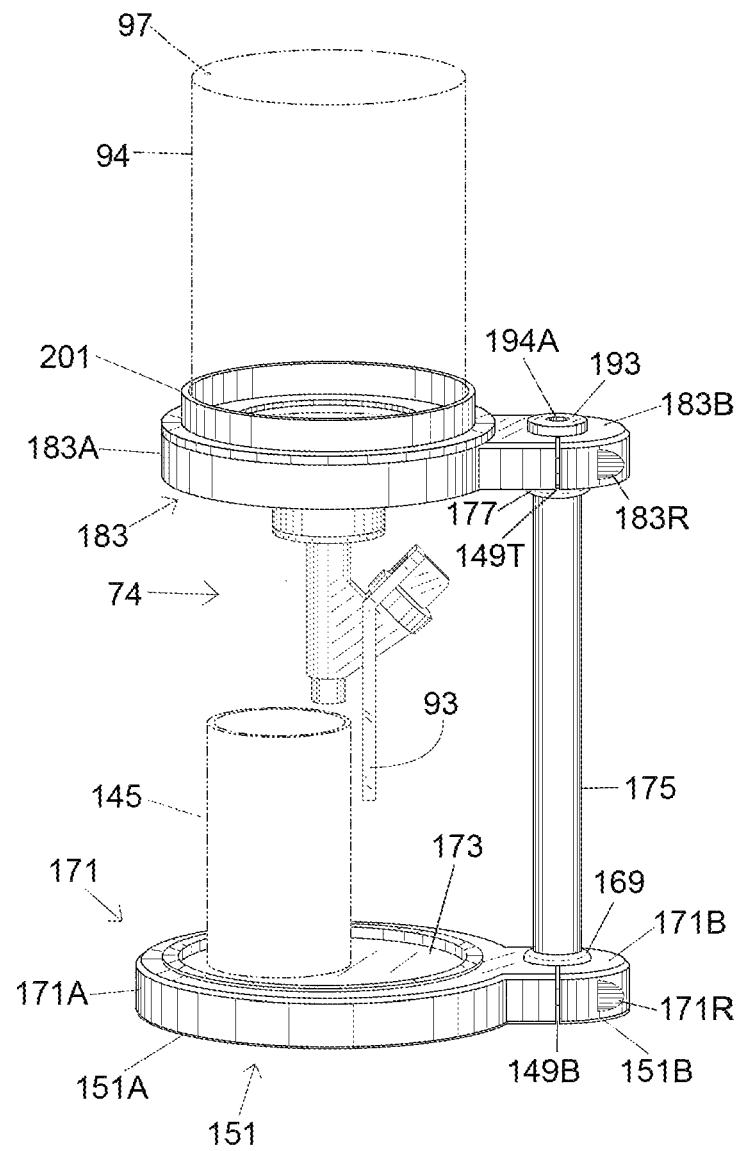
FIG. 11—is a perspective side view of an exemplary water bottle dispenser in accordance with one aspect of the present application.

Referring to FIG. 11, a perspective side view of the dispenser may be seen. The dispenser base 140 may include an assembly of a footpad 151, the base foot 171, a spacer 157, a receiving disc 173, the tubular support 175, the rim 183, a spacer 189, a bushing 193, the bottle collar 201, and a bottle collar 202. The footpad 151 may include an assembly of a footpad section 151A and a footpad section 151B. The footpad sections 151A and 151B may be a "self-adhesive" pad type that attach to a surface once the "peel off" paper backing has been removed, and may be attached to the base foot 171. The footpad section 151A may attach to a foot section 171A and the footpad section 151B may attach to a foot section 171B of the base foot 171. The receiving disc 173 may be adapted to contain any liquid spilled from the cup 145 or the valve 74, and may be partially inserted into the center of the base foot 171. A foot right bolt cavity 171R of the base foot 171 may be seen. The tubular support 175 may be seen attached to the base foot 171 and may extend vertically therefrom. A bottom flange 169 of the tubular support 175 may be seen. Near the top of the tubular support 175 may be a top flange 177. The top flange 177 may support the rim 183 to a fixed vertical elevation. A rim section 183A and a rim section 183B of the rim 183 may be shown. A rim right bolt cavity 183R of the rim 183 may be seen. The rim 183 may be seen attached to the tubular support 175 and may extend horizontally therefrom at a location above the base foot 171. The rim 183 may be in vertical alignment with the base foot 171. The bushing 193 may be seen positioned at the top of rim 183. The bushing 193 may contain an engagement port 194A. The engagement port 194A may be where a fixture stem (which will be shown and discussed later) may engage with the dispenser. A bottle collar 201 may be removably engaged into the rim 183. A division point 149B may be the point where the foot section 171A and the foot section 171B converge after assembly. A division point 149T may the point where rim the section 183A and the rim section 183B converge after assembly. The bottle collar 201 may be adapted to engage and support the supply bottle 94 inverted and positioned within the rim 183. The supply bottle may be coupled to dispenser valve 74. The vent hole 97 in the supply bottle 94, a valve activation lever 93 of dispenser valve 74, and a cup 145 may be seen in the present embodiment.

Figure 12:
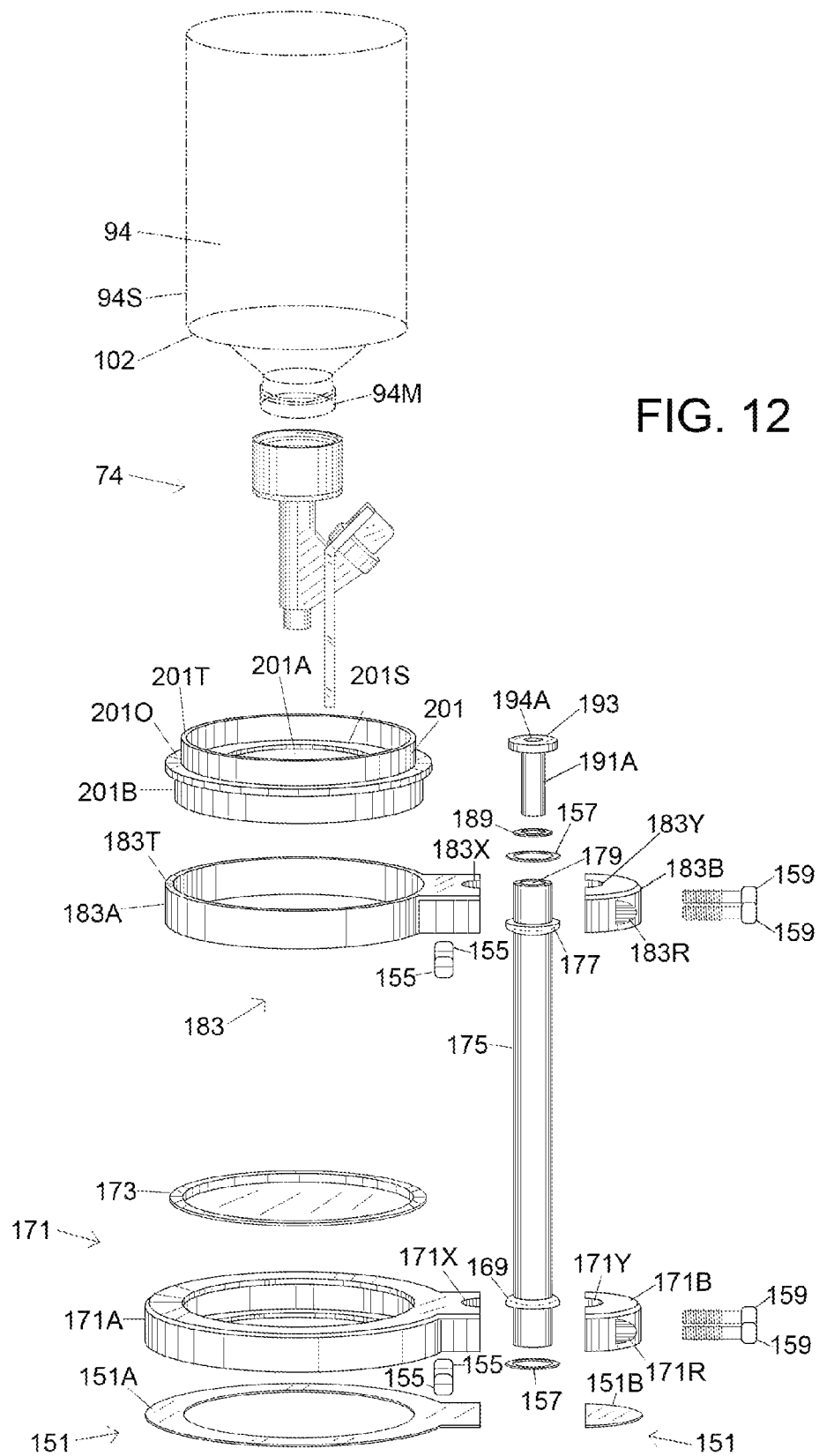
FIG. 12 is an exploded view of FIG. 11 in accordance with one aspect of the present application.

Referring to FIGS. 12-13 and 15-16, the dispenser may be seen in further detail, wherein FIG. 12 may be an exploded view of FIG. 11 and FIGS. 15 and 16 are cross-sectional views taken along sectional lines 15-15 and 16-16 respectively of FIG. 13. Looking at the dispenser base 140, the footpad section 151A and the footpad section 151B of the footpad 151, may attach to the foot section 171A and the foot section 171B of the base foot 171. The base foot 171 may include an assembly of the foot section 171A, the foot section 171B, one or more of a bolt 159, and one or more of a nut 155. The footpad 151 may protect the surface of a desktop, tabletop, countertop, etc., where the dispenser may be placed. The receiving disc 173 may be formed to partially insert into the base foot 171.

The dispenser base 140 may have one or more foot bolt and nut cavities. The base foot bolt and nut cavities may be where the bolts 159 and the nuts 155 may be installed to secure the tubular support 175 between a clamping point 171X and a clamping point 171Y of the base foot 171. In the present embodiment, the right bolt and nut cavity 171R of the may be one of the base foot 171 bolt and nuts cavities (see 171R and a 171L of FIG. 15) where the bolts 159 and the nuts 155 may be installed to secure the tubular support 175 between a clamping point 171X and a clamping point 171Y of the base foot 171. One or more of the bolts 159 and one or more of the nuts 155 may enter the base foot 171 through the base foot right bolt and nut cavity 171R and the base foot left bolt and nut cavity 171L. The bolts 159 may be secured into the nuts 155 that may be inserted into the right and left side base foot bolt and nut cavities 171R and 171L.

The dividing of the base foot 171 into the foot section 171A and the foot section 171B and clamping the tubular support 175 between the two sections is one illustrated example of how the tubular support 175 could be attached to the base foot 171. However, there may be other ways and methods of attaching the tubular support 175 to the base foot 171 other than in the illustrated example of FIG. 12 without departing from the spirit and scope of the present embodiment. Above the base foot 171 the bottom flange 169 of the tubular support 175 may be presented with the protective spacer 157, the protective spacer 157 may protect the surface of the base foot 171 when the dispenser may be fully assembled. The bottom flange 169 may act as a stopper to ensure that tubular support 175 may be flush with the bottom of the base foot 171 when installed. Located near the top of the tubular support 175 may be the top flange 177. The top flange 177 may secure the rim section 183A and the rim section 183B of the rim 183 to a fixed vertical position when attached to the tubular support 175. The rim 183 may include an assembly of the rim section 183A, the rim section 183B, one or more of the bolts 159, and one or more of the nuts 155. The dividing of the rim 183 into the rim section 183A and the rim section 183B and clamping the tubular support 175 between the two sections is one illustrated example of how the tubular support 175 could be attached to the rim 183. However, there may be other ways and methods of attaching the tubular support 175 to rim the 183 other than in the illustrated example of FIG. 12 without departing from the spirit and scope of the present embodiment. The rim spacer 157 may be placed on top of a top flange 177, and may protect the bottom surface of the rim 183. The right bolt and nut cavity 183R of the rim section 183B may be one of the two bolt and nut cavities, referring to 183R and 183L of FIG. 16, where the bolts 159 and the nuts 155 may be installed to secure the tubular support 175 between a clamping point 183X and a clamping point 183Y. The bolts 159 may enter the rim section 183B through the right and the left rim bolt and nut cavities 183R and 183L. The bolts 159 may be secured into the nuts 155 that fit into the right and the left side rim bolt and nut cavities 183R and 183L of the rim 183.

Figure 41:
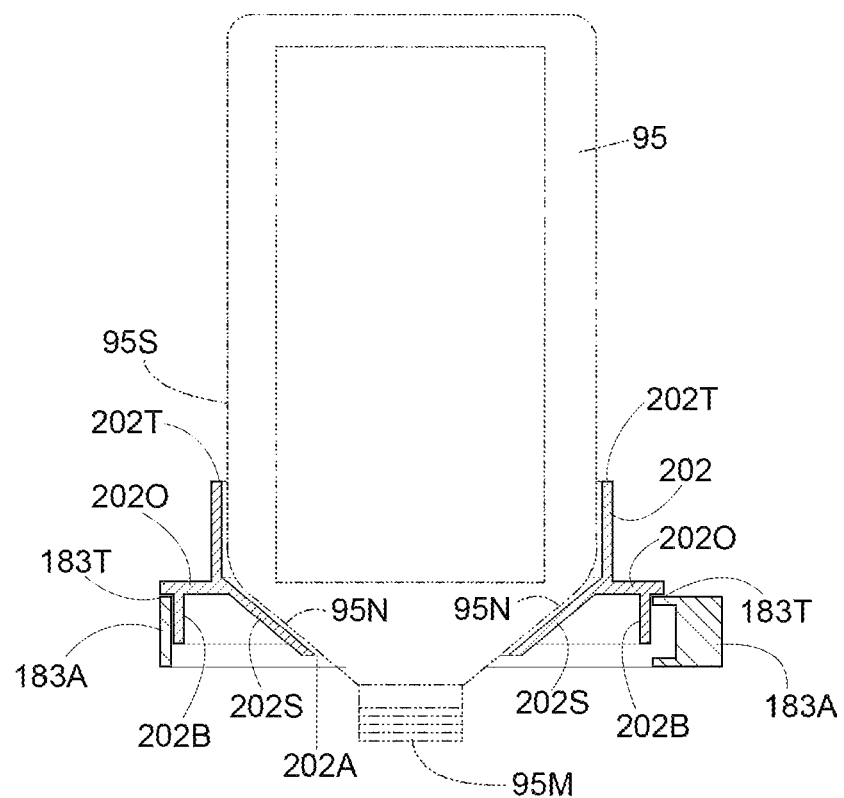
FIG. 41 is a sectional view of the exemplary bottle collar of FIG. 40, taken at the sectioning plane in the direction indicated by section lines 41-41 in accordance with one aspect of the present application.

The spacer 189 may protect the surface of the rim 183 from contact with the bushing 193. An engagement leg 191A of the bushing 193 may engage with a raceway 179 of the tubular support 175. The center aperture in the bushing 193 may be the engagement port 194A that merges with a raceway 179 as seen in FIG. 22. The engagement port 194A of the bushing 193 may be the location where the fixture stem (not shown) engages with the raceway 179 of the tubular support 175 of the dispenser base 140. The rim 183 may removably engage the bottle collar 201, and the bottle collar 201 may removably engage and support the supply bottle 94 inverted and positioned therein. A variety of bottle collars that removably engage different supply bottles can be used with rim 183. For example, the bottle collar 202 and a supply bottle 95, as seen in FIG. 41 may be used with the rim 183. A bottom ring 201B of bottle collar 201 may restrict a lateral movement of bottle collar 201 upon rim 183. The dispenser valve 74 may be coupled to the mouth 94M of the supply bottle 94 and may extend through the center aperture 201A of the bottle collar 201. A bottle seat 201S of the bottle collar 201 may removably engage the supply bottle 94 on a shoulder 102 thereof. The bottle collar top enclosure 201T may engage and surround a sidewall 94S of the supply bottle 94. An outer portion 201O, of the bottle collar 201 may be removably engaged upon a rim top 183T of the rim 183.

Referring to FIG. 14, the backside of the tubular support 175 may be seen along with a tubular support aperture 211. The tubular support aperture 211 may be a niche in the tubular support 175 that may allow for the passage of an electric cord. In the FIG. 15 sectional view, the right and left side base foot bolt and nut cavities 171R and 171L of the base foot 171 may be seen. The raceway 179 of the tubular support 175 may be where an electric cord 143 as may be seen in FIG. 22, passes through the dispenser prior to entering into a fixture stem (not shown).

Referring to the FIG. 16 sectional view, the right and left side bolt and nut cavities 183R and 183L of the rim 183 may be viewed. The raceway 179 of the tubular support 175, and the engagement leg 191A of the bushing 193 as shown in FIG. 12 may be seen.

Figure 17:
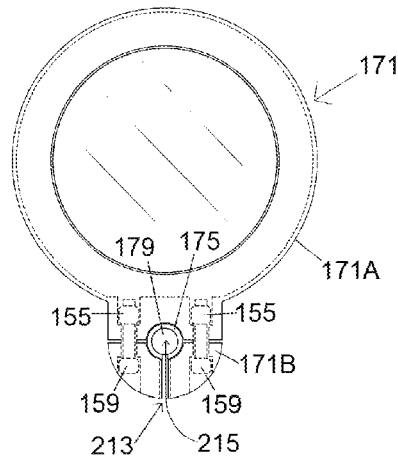
FIG. 17 is an orthogonal bottom view of the exemplary dispenser base of FIG. 13, in accordance with one aspect of the present application.

In the FIG. 17 bottom view, the bolts 159 and the bolt nuts 155 may be installed, and may lock the foot section 171A and the foot section 171B securely into position against the tubular support 175. A base foot aperture 213 may be aligned with the tubular support aperture 211 of the tubular support 175 shown in FIG. 14 to create a raceway 215. The raceway 215 may merge with a raceway 179 at an intersection 217 as may be seen in FIG. 22. The raceway 179 then may head upward through the tubular support 175, and may merge with the engagement port 194A of the bushing 193.

Figure 18:
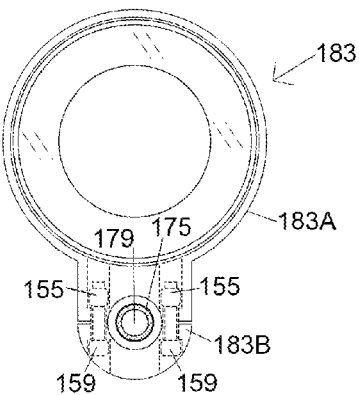
FIG. 18 is a sectional view of the exemplary dispenser base of FIG. 13 taken at the sectioning plane in the direction indicated by section lines 18-18 in accordance with one aspect of the present application.

Referring to the sectional view FIG. 18, one may see the bolts 159 and the nuts 155 installed, which may lock the rim section 183A and the rim section 183B securely into position against the tubular support 175. The raceway 179 may merge with the raceway 215 as shown in FIG. 17.

Figure 19:
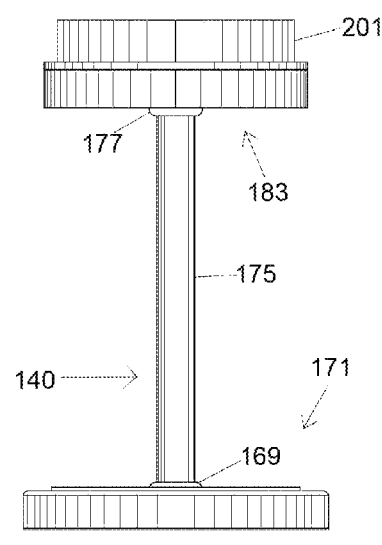
FIG. 19 is an orthogonal front view of the exemplary dispenser base in accordance with one aspect of the present application.

Referring to FIG. 19 a front view of dispenser base 140 may be seen. The bottle collar 201 may be engaged upon the rim 183, and the rim 183 may be engaged upon the top flange 177 of the tubular support 175. The bottom flange 169 of the tubular support 175 may be seated upon the base foot 171.

Figure 20:
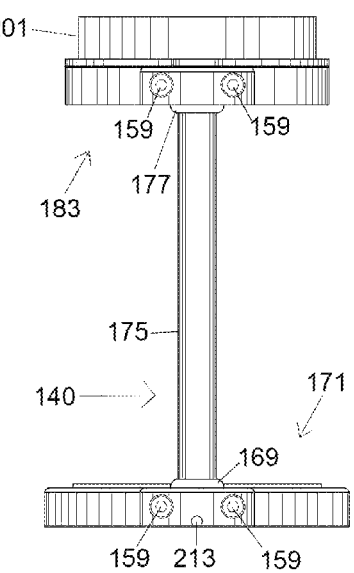
FIG. 20 is an orthogonal rear view of the exemplary dispenser base in accordance with one aspect of the present application.

Referring to FIG. 20 a backside view of the dispenser base 140 may be seen. The bottle collar 201 may be engaged upon the rim 183. The bolts 159 may be secured into place into the base foot 171 and the rim 183. The top flange 177 may be butted up against the rim 183, and bottom flange 169 may be butted up against the base foot 171. The base foot aperture 213 of the base foot 171 may lead to the tubular support aperture 211 shown in FIG. 14. The base foot aperture 213 may be the entrance to the raceway 215 shown in FIG. 17. The FIG. 21 illustration may be an orthogonal rear view of dispenser base 140.

Referring to FIGS. 21 and 22, wherein FIG. 22 is a sectional view of dispenser base 140 taken along section lines 22-22 of FIG. 21 may be seen. The circular top enclosure 201T of the bottle collar 201 may be formed to engage a circular body of the supply bottle 94. The circular top enclosure 201T may surround a portion of a sidewall 94S of the circular body of the supply bottle 94. The circular top enclosure 201T may be formed to restrict a lateral movement of the supply bottle 94 inverted and positioned therein. The bottle seat 201S of the bottle collar 201 may merge with the circular top enclosure 201T. The bottle seat 201S may be formed to removably engage the supply bottle 94 on a shoulder 102 thereof. The bottle seat 201S may have the center aperture 201A where an angled neck 94N and the mouth 94M of the supply bottle 94 may extend there through when the supply bottle 94 is inverted and positioned thereon. The outer portion 201O of the bottle collar 201 may merge with the bottle seat 201S and the top enclosure 201T of the bottle collar 201. The outer portion 201O of the bottle collar 201 may be formed to removably engage upon the rim top 183T of the rim 183. Thus, the bottle collar 201 may be removably engaged upon the rim 183. The bottom ring 201B may merge with the outer portion 201O of the bottle collar 201. The bottom ring 201B may be positioned on the inside of the rim 183, and may be formed to restrict a lateral movement of the bottle collar 201 upon the rim 183. The bottom ring 201B could also be formed on the outside of the rim 183 to restrict the lateral movement of the bottle collar 201 upon the rim 183. The raceway 179 of the dispenser base 140 may be viewed merging with the raceway 215 at the intersection 217. The electric cord 143 may enter at the base foot aperture 213, may pass through the raceway 215, and may pass through the tubular support aperture 211 shown in FIG. 14. The electric cord 143 may then take a turn up at the intersection 217, and may move into the raceway 179 of the tubular support 175. From the tubular support 175, the electric cord 143 may move into the engagement port 194A, of the engagement leg 191A of the bushing 193.

Referring to FIGS. 11, 14, 17, 18, and 22, the assembly and operation of the dispenser of FIG. 11 may now be disclosed. The dispenser base 140 may be offered as an unassembled dispenser base 140, so it may be necessary to describe the assembly process prior to the operation. First of all, the footpad 151A may be attached to the foot section 171A, and the footpad 151B may be attached to the foot section 171B. The bolts 159 and the nuts 155, may be used to attach the foot section 171A to the foot section 171B, as may be seen in FIG. 17. However, the bolts 159 may not be tightened into nuts 155 completely at this point as to allow for some slack between the foot section 171A and the foot section 171B, so that the tubular support 175 may be installed. Next, the foot section 171A attached to the foot section 171B may be placed in an upright position on a countertop. The protective spacer 189 may be installed onto the tubular support 175 at the electric cord aperture 211 end. Making sure that the support and conduit tube 175 is upright with the electric aperture 211 at the bottom, the electric cord aperture 211 end of the tubular support 175 may be placed between the foot section 171A and the foot section 171B. It should be noted sure that tubular support aperture 211 of FIG. 14 may be in alignment with the base foot aperture 213 of FIG. 20, to create raceway 215 of FIGS. 17, 22. Next, the bolts 159 may be tightened into the nuts 155 making sure the division point 149B of FIG. 11 finishes the same on the right and left side of the base foot 171. At this point, the protective spacer 157 may be installed onto the top of the support and conduit tube 175.

Moving along, the rim section 183A may be attached to the rim section 183B using the bolts 159 and the nuts 155 of FIG. 18. Again, the bolts 159 may not be tightened into the nuts 155 completely at this point as to allow for some slack between the rim section 183A and the rim section 183B, so that the tubular support 175 may be installed. In the next step the rim section 183A attached to the rim section 183B of the rim 183 may be placed over the tubular support 175 so that the tubular support 175 may lie between the rim section 183A and the rim section 183B. At this point the rim 183 may be resting on the top flange 177 of FIG. 12. The bolts 159 may now be tightened into the nuts 155 making sure the division point 149T of FIG. 11 may finish the same on the right and left side of the rim 183. It should be noted that before completely securing rim 183 to tubular support 175, and tightening bolts 159 into nuts 155, it that rim 183 may need to be in vertical alignment with the base foot 171. Next, the engagement leg 191A of the bushing 193 may be inserted through spacer 189. Now the engagement leg 191A of the bushing 193 may be inserted into the raceway 179 of the tubular support 175. Next, the bottle collar 201 may be engaged upon the rim 183. At this point the dispenser valve 74 may be coupled onto the supply bottle 94 of FIG. 11, and the supply bottle 94 may be inverted with the dispenser valve 74 attached, and inserted into the bottle collar 201. The vent hole 97 may now be administered into supply bottle 94. The dispenser may now be ready for service.

Figure 23:
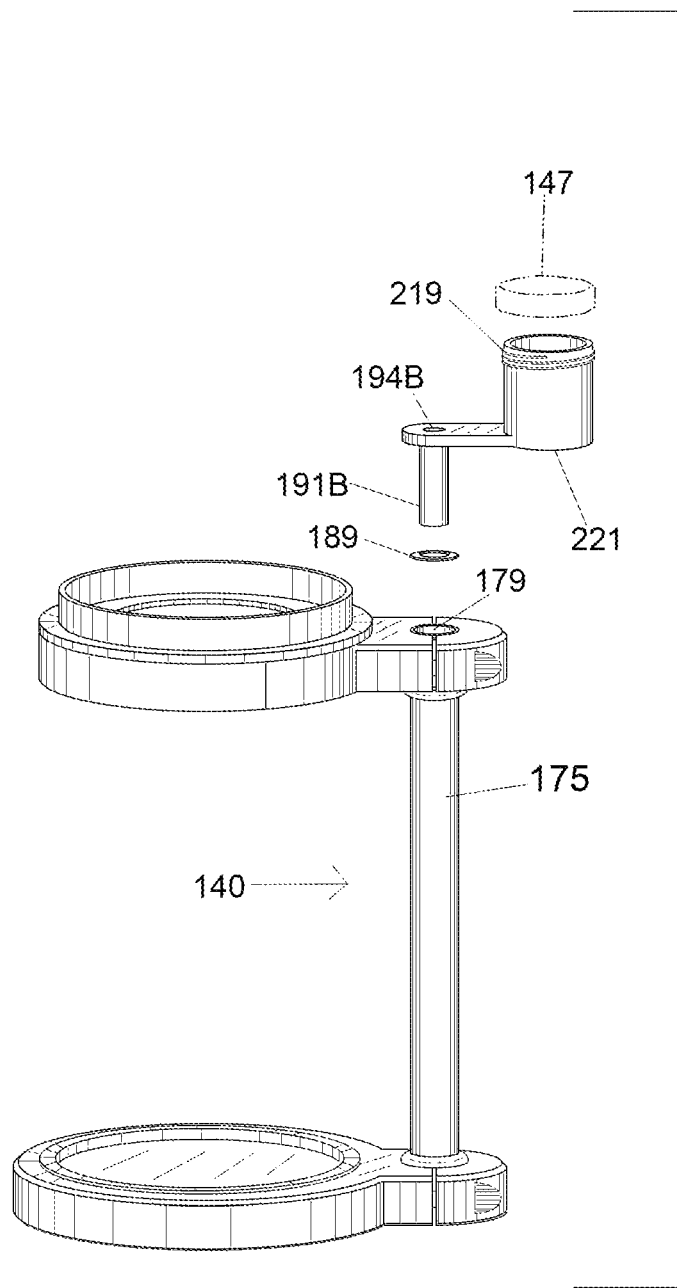
FIG. 23 is an exploded view of the exemplary dispenser base and a retaining cylinder in accordance with one aspect of the present application.

Referring to FIG. 23, an exploded view of the dispenser base 140 and a retaining device 221 may be shown. The retaining device 221 may have a threaded cylinder 219. A tubular engagement leg 191B of the retaining device 221 may be fitted with the spacer 189. The tubular engagement leg 191B may be engaged to the raceway 179 of the dispenser base 140. A bottle cap 147 that was removed from the supply bottle 94 of FIG. 24 may be threadably secured into place onto the threaded cylinder 219 of the retaining device 221. An engagement port 194B of the tubular leg 191B may be where a fixture stem (not shown) engages the dispenser base 140 and extends vertically therefrom.

Figure 24:
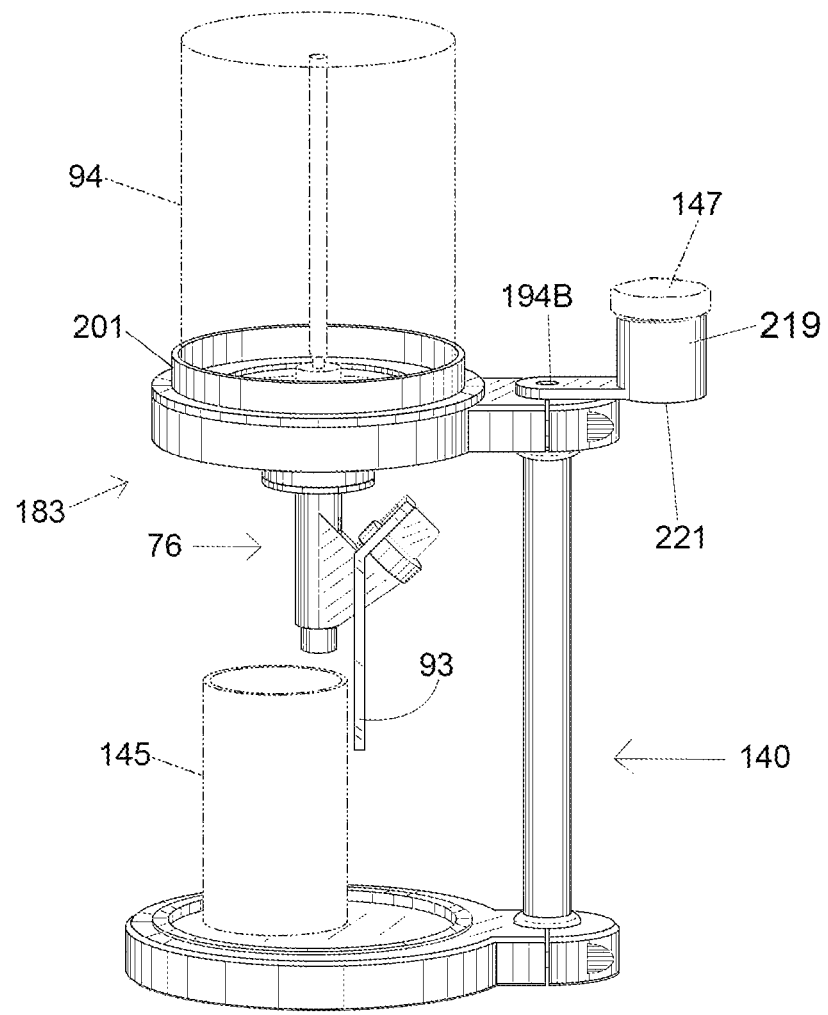
FIG. 24 is a perspective side view of the exemplary water bottle dispenser and the exemplary retaining cylinder in accordance with one aspect of the present application.
Figure 25:
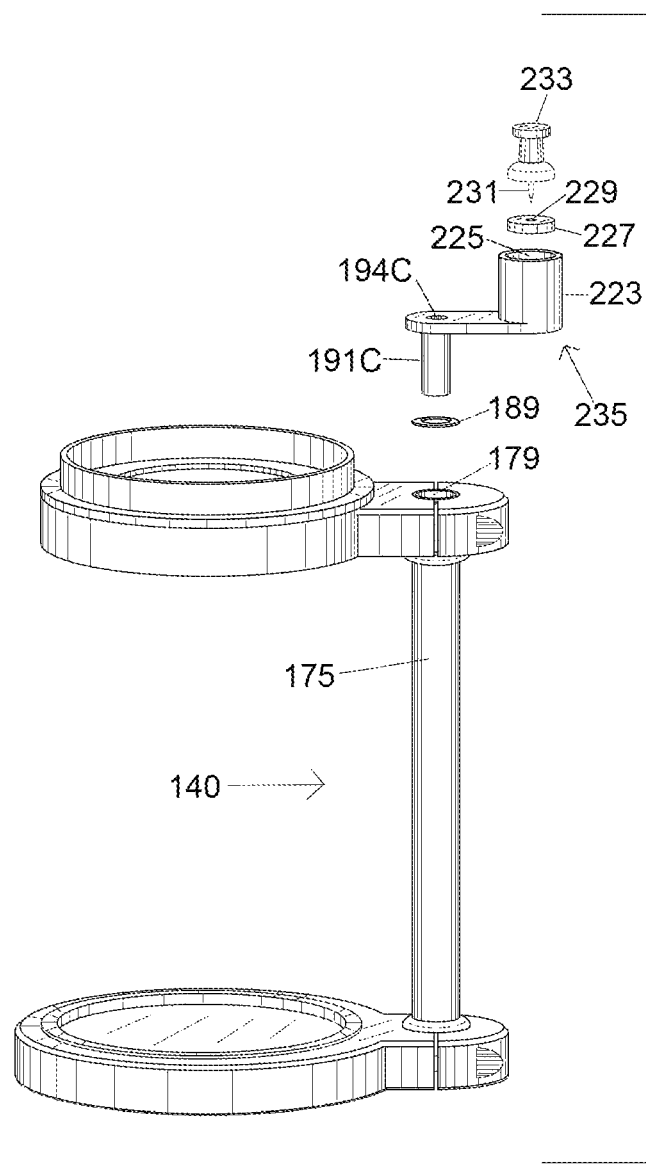
FIG. 25 is an exploded view of the exemplary dispenser base and the exemplary support device assembly in accordance with one aspect of the present application.

FIG. 24 may show a side view of the dispenser base 140 and the retaining device 221. The retaining device 221 may have the threaded cylinder 219. The threaded cylinder 219 may store a piercing tool 233 (as shown in FIG. 25) used for administering a vent hole in the supply bottle 94. It may be noted that supply bottle 94 may not require a vent hole when coupled to the dispenser valve 76. However, a non-vented valve may require a vent hole in the supply bottle 94. The bottle cap 147 may be removed from the supply bottle 94 and may be threadably secured onto the threaded cylinder 219 of the retaining device 221 of the dispenser. The bottle cap 147 of the supply bottle 94 may be replaced with the dispenser valve 76. The supply bottle 94 may be removably engaged, and inverted and positioned within the bottle collar 201, and bottle collar 201 may be removably engaged upon the rim 183 of the dispenser base 140. The cup 145 may be urged against the valve activation lever 93 of the dispenser valve 76 to extract the liquid from the supply bottle 94. The engagement port 194B may be where a fixture stem shown later engages with raceway 179 of the tubular support 175 of the dispenser base 140 as shown in FIG. 12.

Referring to FIGS. 23 and 24, the operation of the dispenser having the retaining device 211 of FIG. 23 may now be disclosed. First of all, the spacer 189 may be placed on the engagement leg 191B of the retaining device 221. Next, the retaining device 221 may be installed by inserting the engagement leg 191B into the raceway 179 of the dispenser base 140 so that the retaining device 221 may be engaged upon the dispenser base 140. The bottle cap 147 may now be removed from the supply bottle 94 and may be threadably secured onto the threaded cylinder 219 of the retaining device 221. Now the dispenser valve 76 may be installed on to the supply bottle 94. The supply bottle 94 with the dispenser valve 76 attached may then be inverted, and the dispenser valve 76 may be inserted through the bottle collar 201 so that the supply bottle 94 is engaged within the bottle collar 201. The dispenser may now be ready for service.

Referring to FIG. 25, an exploded view of a support device 235 and dispenser base 140 may be seen. The support device 235 may include an assembly of a support member 223, the spacer 189, a magnet 227, and the piercing tool 233. The support device 235 may engage the dispenser base 140 with the engagement leg 191C extending therefrom. The engagement port 194C of the engagement leg 191C may be where a light fixture (not shown) engages the dispenser base 140 and extends vertically therefrom. The piercing tool 233 may be used for administering the vent hole 97 in the supply bottle 94 of FIG. 26. The piercing tool 233 may be magnetically engaged to the support device 235. The spacer 189 may be placed onto the tubular engagement leg 191C. The tubular engagement leg 191C of the support device 235 may be releasably engaged to the raceway 179 of the dispenser base 140. One of the apertures in the support member 223 may be the engagement port 194C. The engagement port 194C may be where a fixture stem shown later engages with the raceway 179 of the tubular support 175. A magnet cavity 225 may be located inside of the support member 223, and is the location where the magnet 227 may releasably engage the piercing tool 233. A piercing tool spike 231 may enter through a magnet center hole 229. The magnet 227 may magnetically engage the piercing tool 233 to the support member 223 of the support device 235. The piercing tool 233 may be partially or completely made of metal and may have a strong attraction to the magnet 227. Nevertheless, the piercing tool 233 may also rely solely on the metal of the piercing tool spike 231 for the magnetic attraction.

Figure 26:
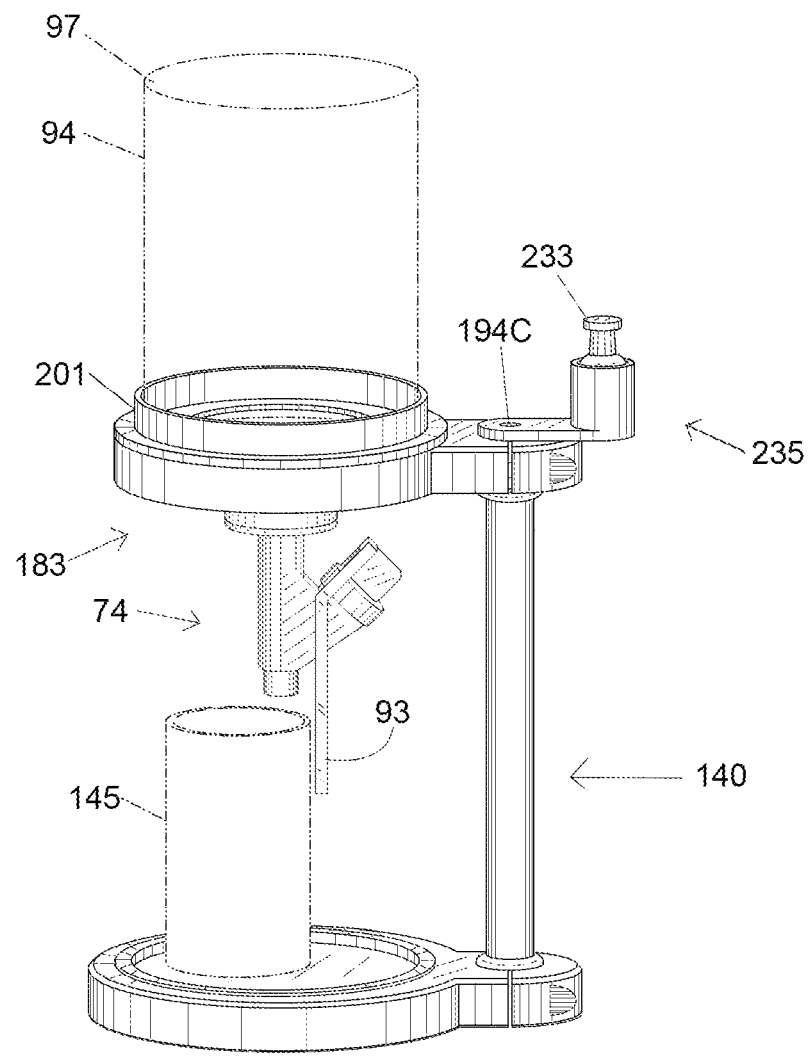
FIG. 26 is a perspective side view of the exemplary water bottle dispenser and the exemplary support device assembly in accordance with one aspect of the present application.

Referring to FIG. 26, the support device 235 may be releasably engaged to the dispenser base 140, and the piercing tool 233 may be releasably engaged to the support device 235. Thus, the piercing tool 233 may be releasably engaged to the dispenser base 140. The engagement port 194C may be where a fixture stem not show yet can be attached to the dispenser. The dispenser valve 74 may be coupled to the supply bottle 94, which is inverted. The supply bottle 94 may be removably engaged within the bottle collar 201, and the bottle collar 201 may be removably engaged upon the rim 183 of the dispenser base 140. The piercing tool 233 may be used to administer a vent hole in the supply bottle 94. The cup 145 may be urged against the valve activation lever 93 of the dispenser valve 74, and the liquid may be dispensed from the supply bottle 94.

Figure 27:
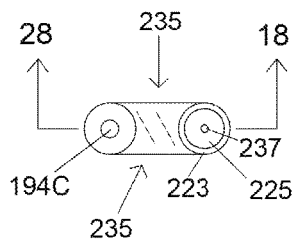
FIG. 27 is an orthogonal top view of the exemplary support device assembly.
Figure 31:
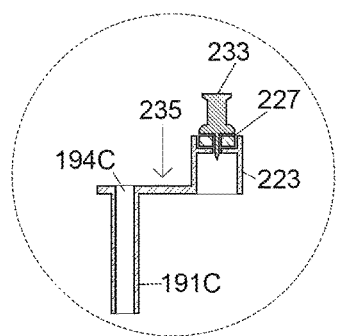
FIG. 31 is a sectional view of the exemplary support device assembly of FIG. 30 taken at the sectioning plane in the direction indicated by section lines 31-31 in accordance with one aspect of the present application.

Referring to FIG. 27, a top view of the support device 235 void of the magnet 227 and piercing tool 233 of FIG. 31 may be seen. The engagement port 194C may be shown. The support member 223 may contain the magnet cavity 225, and may be seen with a magnet shelf aperture 237.

Figure 28:
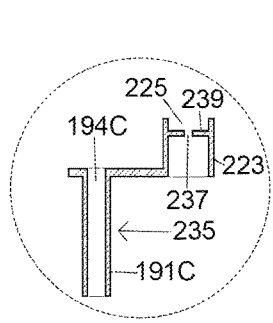
FIG. 28 is a sectional view of the exemplary support device assembly of FIG. 27 taken at the sectioning plane in the direction indicated by section lines 28-28 in accordance with one aspect of the present application.

Referring to the FIG. 28 a sectional view of the engagement port 194C of the support device 235 may be seen. The engagement leg 191C may removably engage into raceway 179 of FIG. 25. A magnet shelf 239 may be located at the bottom of the magnet cavity 225, and the magnet shelf aperture 237 may be found in the center of the magnet shelf 239. The support member 223 may be shown.

Figure 29:
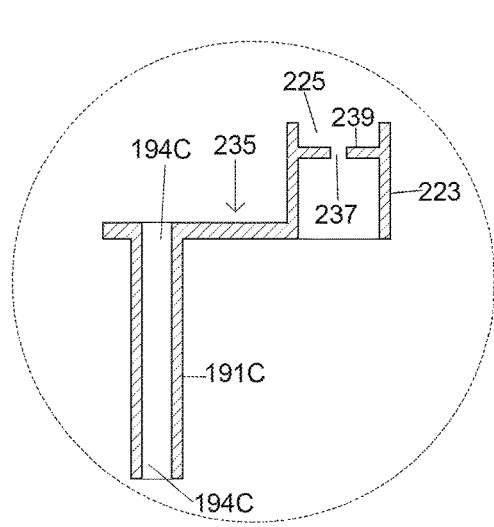
FIG. 29 is an enlarged view of the exemplary support device assembly of FIG. 28 in accordance with one aspect of the present application.

Referring to FIG. 29, an enlarged view of FIG. 28 may be seen. The engagement port 194C of the support device 235 may be seen. The engagement leg 191C may removably engage into the raceway 179 of FIG. 25. The magnet shelf 239 may located at the bottom of the magnet cavity 225, and the magnet shelf aperture 237 may be found in the center of the magnet shelf 239. The support member 223 may also be seen in the present embodiment.

Figure 30:
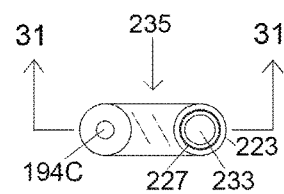
FIG. 30 is an orthogonal top view of the exemplary support device assembly in accordance with one aspect of the present application.

Referring to FIG. 30, a top view of the support device 235, the engagement port 194C, the magnet 227, the piercing tool 233, and the support member 223 may be seen.

Referring to FIG. 31, a sectional view of the engagement port 194C of the support device 235 may be shown. The magnet 227 may be contained in the support member 223. The piercing tool 233 may be magnetically secured to the support member 223 by the magnet 227. The Engagement leg 191C may releasably engage into the raceway 179 of FIG. 25.

Figure 32:
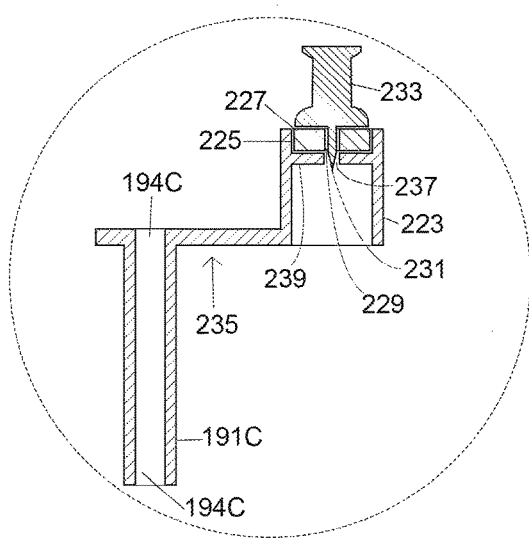
FIG. 32 is an enlarged view of the exemplary support device assembly of FIG. 31 in accordance with one aspect of the present application.

Referring to FIG. 32, an enlarged view of FIG. 31 may be shown with additional references. The engagement port 194C of the support device 235 may be seen. The piercing tool 233 may be magnetically engaged to the magnet 227. The magnet 227 may be seated on the magnet shelf 239. The magnet shelf 239 may be located at the bottom of the magnet cavity 225 of the support member 223. The magnet 227 may be placed in the magnet cavity 225 of the support member 223. The piercing tool spike 231 may be placed through the magnet hole 229, and the magnet shelf aperture 237. The engagement leg 191C may be releasably engaged into the raceway 179 of FIG. 25.

Referring to FIGS. 25, 26, 28, 29 and 32, the operation of the dispenser having the support device 235 of FIG. 26 may now be disclosed. To begin with the spacer 189 may be placed on the engagement leg 191C of the support device 235 of FIG. 25. Next, the support device 235 may be installed on the dispenser base 140. The engagement leg 191C of the support device 235 may be inserted into the raceway 179 of the dispenser base 140. The support device 235 may now be engaged upon on the dispenser base 140. Next, the magnet 227 may be attached it to the magnet shelf 239 by placing it into the magnet cavity 225 of the support member 223. Piercing tool 233 may then be magnetically engaged to support member 223 as shown in FIGS. 31 and 32. Next, the bottle collar 201 may now be engaged upon the rim 183. Next, the dispenser valve 74 may be installed onto the supply bottle 94, the supply bottle 94 may be inverted with the dispenser valve 74 attached, then the supply bottle 94 may be inserted into the bottle collar 201. At this point the supply bottle 94 may now be vented. The piercing tool 233 may be removed from the support device 235. Next, using the piercing tool spike 231 of the piercing tool 233, a vent hole 97 may be administered at the top of the supply bottle 94 inverted thereon. The piercing tool 233 may now be placed back into the support device 235. The dispenser may now ready for service.

Figure 33:
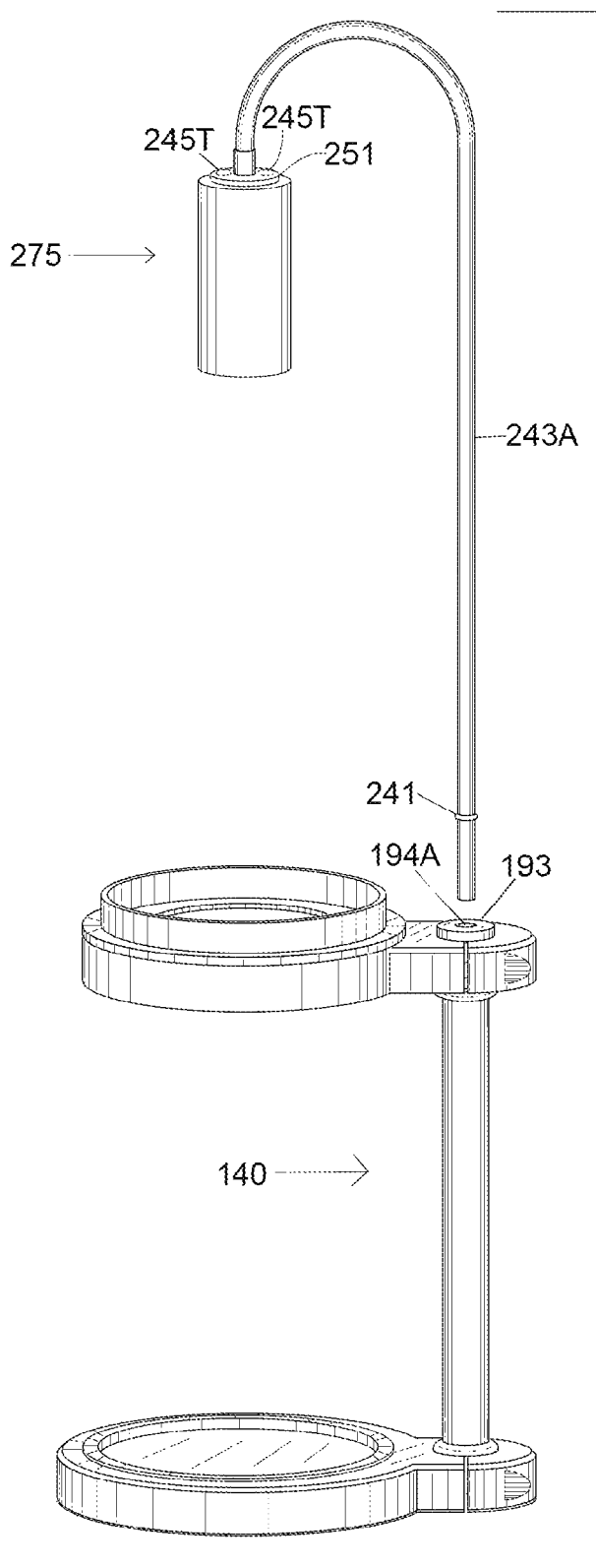
FIG. 33 is an exploded view of the exemplary dispenser base, an exemplary fixture stem, and an exemplary light fixture assembly, in accordance with one aspect of the present application.

Referring to FIG. 33, an exploded view of a light fixture 275 attached to a fixture stem 243A, and the dispenser base 140 may be seen. The engagement port 194A of the bushing 193 may be where the fixture stem 243A engages with the dispenser base 140 and extends vertically therefrom. A fixture stem flange 241 of the fixture stem 243A may hold the light fixture 275 at a fixed vertical position to the bushing 193. A machine screw 245T, and a compression bracket 251 may be seen.

Figure 34:
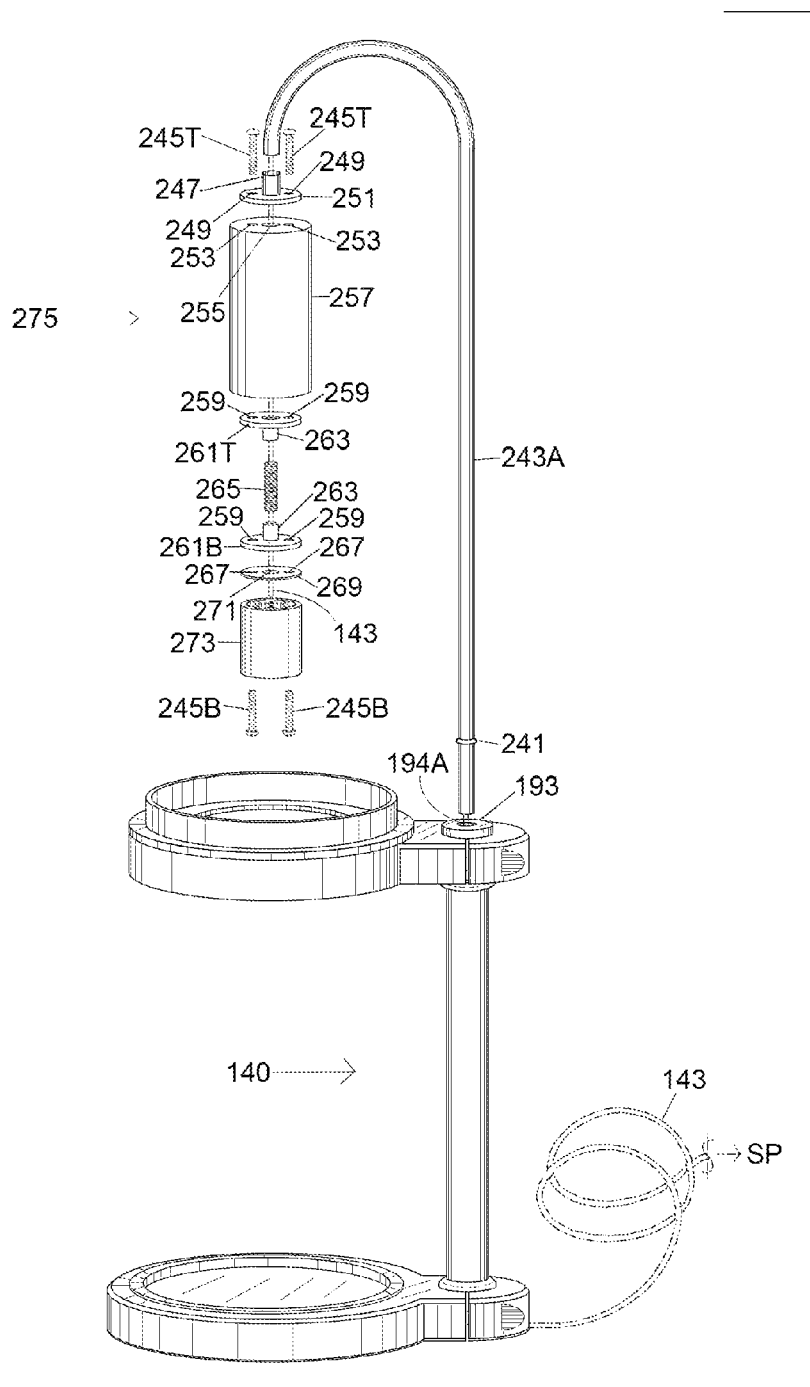
FIG. 34 is an exploded view of the exemplary dispenser base, the exemplary fixture stem, and the exemplary light fixture assembly in accordance with one aspect of the present application.

Referring to FIG. 34, an exploded view of the dispenser base 140, the fixture stem 243A, and the light fixture 275 and may be seen. The light fixture 275 may include an assembly of one or more of a machine screw 245B, a standard light bulb socket 273, an insulating spacer 269, a bottom bracket 261B, a threaded nipple 265, a top bracket 261T, a lamp housing 257, the compression bracket 251, and one or more of the machine screw 245T. The bushing 193 may be inserted into the dispenser base 140. The center hole in the bushing 193 may be the engagement port 194A that may merge with the raceway 179 as shown in FIG. 22. The engagement port 194A may the location that the fixture stem 243A engages with the raceway 179 of the tubular support 175 as shown in FIG. 12. Moving up, the fixture stem flange 241 may hold the fixture stem 243A at a secure vertical position when engaged with the engagement port 194A of the bushing 193 of the dispenser base 140. A bracket compression cylinder 247 of the compression bracket 251 may be factory compressed onto the fixture stem 243A. The machine screw 245T may enter a bracket hole 249 of the compression bracket 251. The machine screw 245T may pass through a lamp housing screw hole 253 of the lamp housing 257. Next, the machine screw 245T may then enter a threaded screw hole 259 of the top bracket 261T. The machine screw 245B may enter the standard light bulb socket 273. The machine screw 245B may pass through a spacer screw hole 267 of the insulating spacer 269. The machine screw 245B may then enter threaded screw hole 259 of the bottom bracket 261B. The threaded nipple 265 may be threadably secured into a cylinder bracket 263 of the top bracket 261T and the bracket threaded cylinder 263 of the bottom bracket 261B.

In communication with a remote power source indicated by SP, an electric cord 143 may pass through dispenser base 140, the bushing 193, and enter the fixture stem 243A. The electric cord 143 may then pass through the fixture stem 243A, and into the bracket compression cylinder 247, the compression bracket 251, a lamp housing hole 255, the threaded cylinder bracket 263 of the top bracket 261T, the threaded nipple 265, the threaded cylinder bracket 263 of the bottom bracket 261B, a spacer nipple hole 271 of the insulating spacer 269, and into the standard light bulb socket 273.

Figure 35:
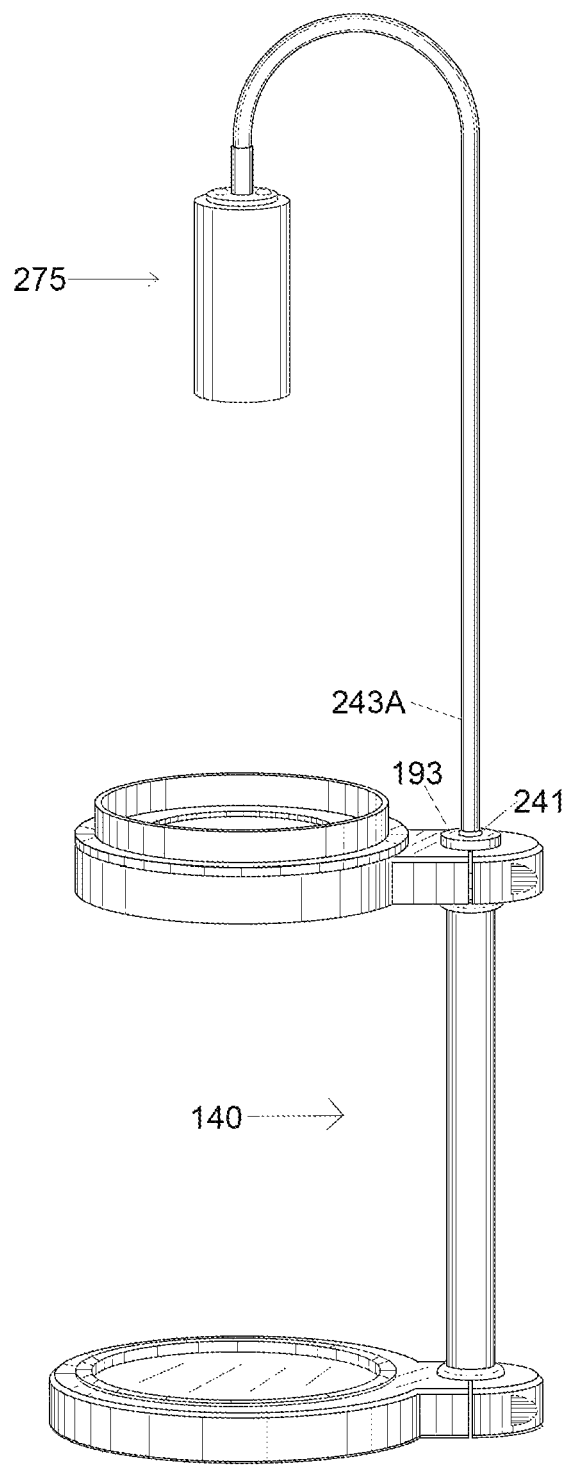
FIG. 35 is a perspective side view of the exemplary dispenser base, the exemplary fixture stem, and the exemplary light fixture in accordance with one aspect of the present application.

Referring to FIG. 35, the light fixture 275 may be seen attached to the fixture stem 243A. The fixture stem 243A may be seen engaging with the bushing 193 of the dispenser base 140 and extending vertically therefrom. The stem flange 241 of the fixture stem 243A may be seen butted up against the bushing 193 of the dispenser base 140.

Figure 36:
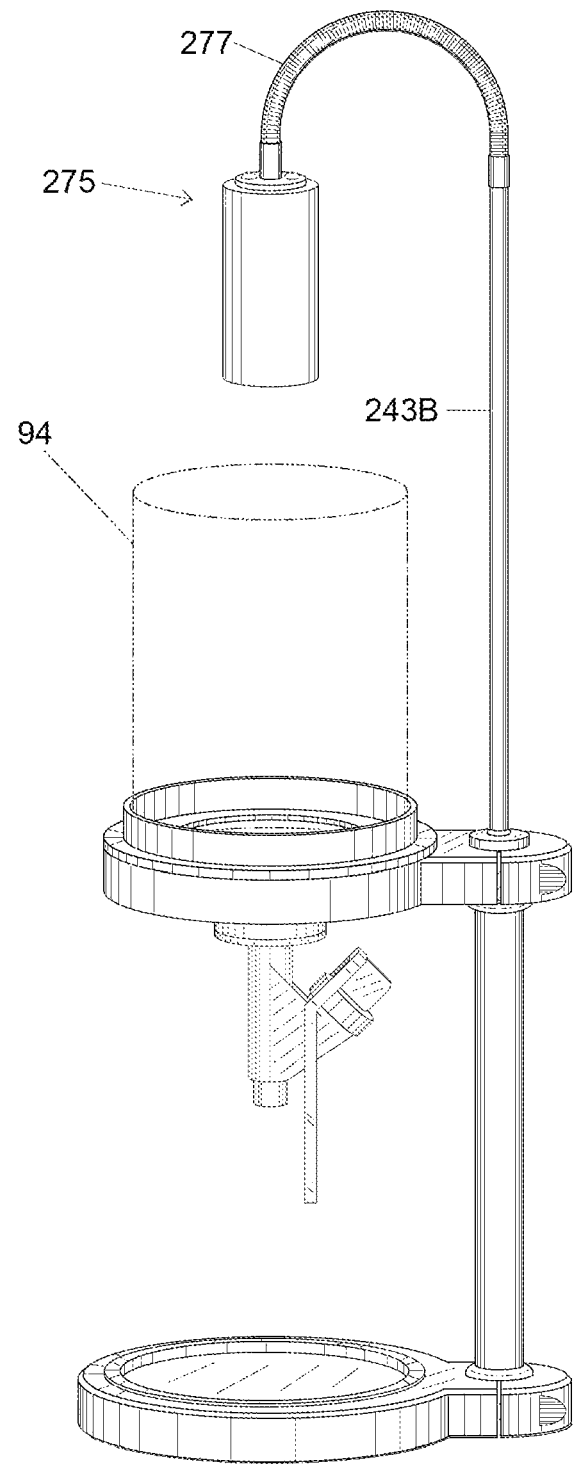
FIG. 36 is a perspective side view of the exemplary water bottle dispenser, and exemplary fixture stem, and the exemplary light fixture in accordance with one aspect of the present application.

FIG. 36 may show the light fixture 275 attached to a fixture stem 243B. The fixture stem 243B may have a flexible metallic tube 277 attached to it that may allow the light fixture 275 to adjust to positions other than downward toward the supply bottle 94.

Figure 37:
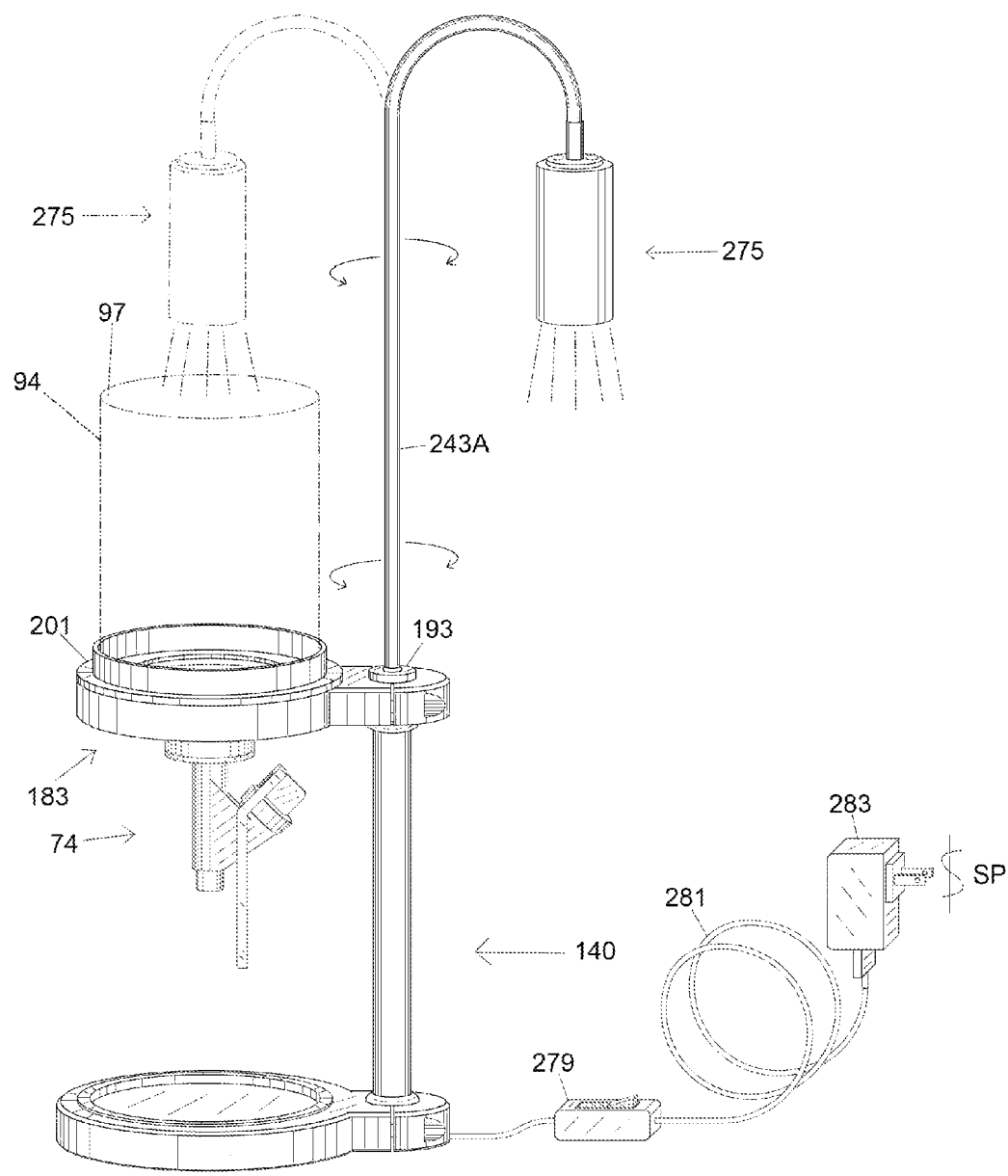
FIG. 37 is a perspective side view of the exemplary water bottle dispenser, the exemplary fixture stem, and the exemplary light fixture in accordance with one aspect of the present application.

Referring to FIG. 37, the movement of the light fixture 275 from a position above the supply bottle 94, to a position to the right of the supply bottle 94 may be shown. The fixture stem 243A may be turned either clockwise or counter clockwise within the bushing 193. The light fixture 275 may be moved away from the supply bottle 94, so the supply bottle 94 may be removed when empty, and replaced. The vent hole 97 may required for adequate flow of the liquid from the supply bottle 94 when the dispenser valve 74 may be used. The supply bottle 94 may be removably engaged in the bottle collar 201, and the bottle collar 201 may be removably engaged upon the rim 183 of the dispenser base 140. The remote power source SP may be indicated by an AC adaptive power plug 283 in communication with the inline power switch 279 to the power conductive wire 281. The power conductive wire 281 in communication with the illumination source (not shown) of light fixture 275 as may be seen.

Referring to FIGS. 34 and 37 the operation of the dispenser base 140 having the light fixture 275 of FIG. 37 may now be disclosed. The dispenser may be placed on the top surface of a countertop, tabletop or desktop. Next, the fixture stem 243A may be rotated counterclockwise or clockwise enough so that the light fixture 275 may be away from the rim 183. At this point a light bulb (not shown) may be installed into the standard light bulb socket 273 shown in FIG. 34 of the light fixture 275 shown in FIG. 37. Now the bottle collar 201 may be removably engaged upon the rim 183. Moving along, the dispenser valve 74 may be threadably coupled onto an upright supply bottle 94 (upright illustration of the supply bottle 94 not shown). At this point, the supply bottle 94 may be installed into the bottle collar 201. The supply bottle 94 with the dispenser valve 74 attached, may be inverted, and lowered into position into the bottle collar 201 of FIG. 37. Now the fixture stem 243A may be rotated so that light fixture 275 is centered over the supply bottle 94. Next, the AC adaptive power plug 283 may be plugged into a power supply. Lastly, the vent hole 97 may be administered into the supply bottle 94. The dispenser may now be ready for service.

Figure 38:
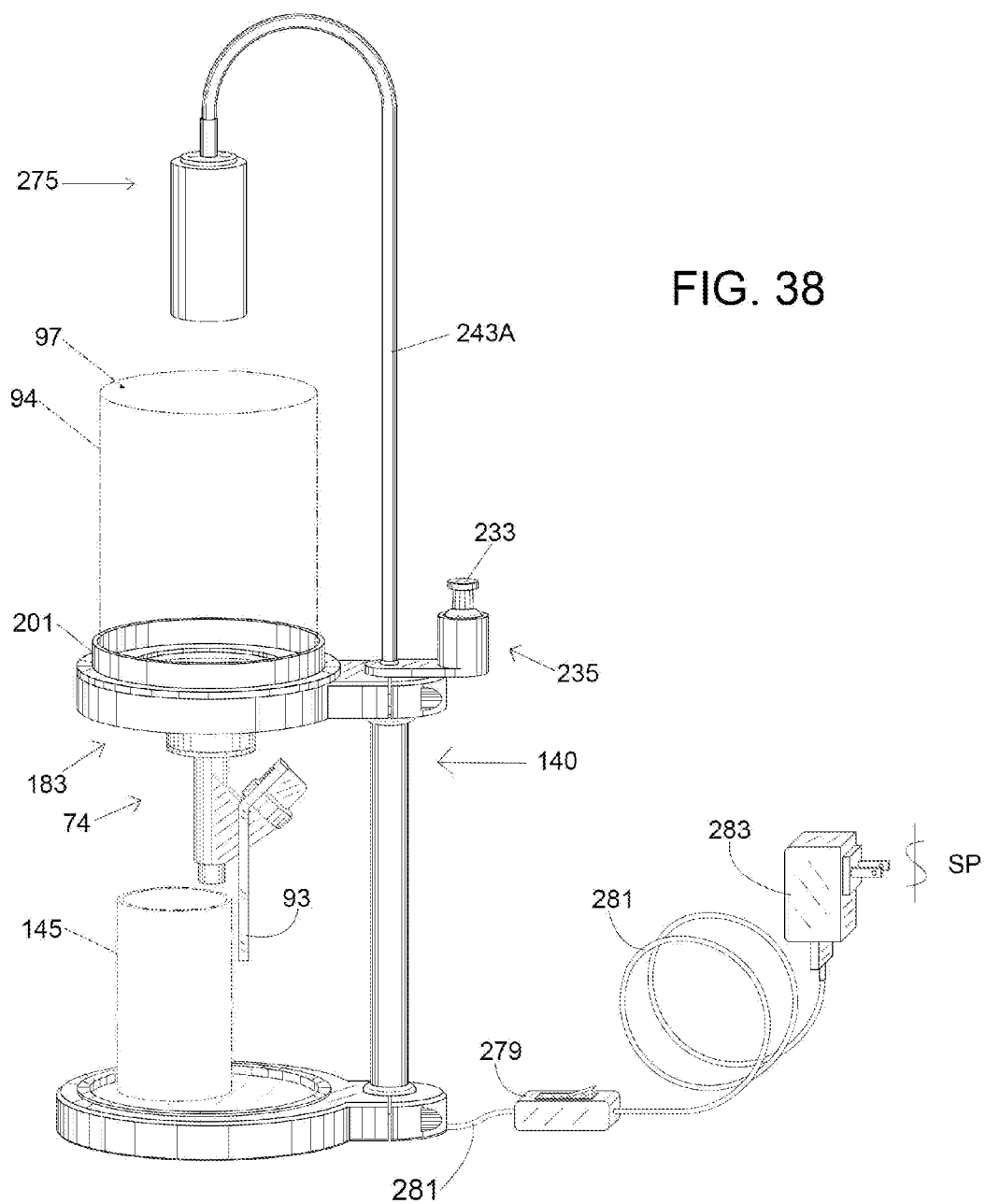
FIG. 38 is a perspective side view of the exemplary water bottle dispenser, the exemplary fixture stem, and the exemplary support device assembly, and the exemplary light fixture in accordance with one aspect of the present application.

In FIG. 38 the dispenser may be combined with the support device 235, the fixture stem 243A and the light fixture 275. The supply bottle 94 may be engaged within bottle collar 201, and bottle collar 201 may be removably engaged upon the rim 183 of the dispenser base 140. The piercing tool 233 of the support device 235 may be used to administer a vent hole 97 into the supply bottle 94. Upon the urging of the cup 145 against the valve activation lever 93 of the dispenser valve 74, the liquid may be delivered from the supply bottle 94 into the cup 145. The remote power source SP may be indicated by the AC adaptive power plug 283 in communication with the inline power switch 279 to the power conductive wire 281. The power conductive wire 281 in communication with the illumination source (not shown) of the light fixture 275 as may be seen. A standard incandescent light bulb (not shown) and wiring may be used with the dispenser as an illumination source in the light fixture 275. However, a low voltage LED light and wiring may be a safer illumination source, and may also be used in the light fixture 275. Additionally, a variety of hand held remote controlled low voltage multi-colored LED lamps may be available in the market today. Moreover, LED bulbs may burn much cooler than incandescent bulbs, thus may be less likely to raise the temperature of the liquid in the supply bottle 94 of FIG. 38. Also, the luminosity of LED bulbs may be adequate to illuminate the supply bottle 94 of FIG. 38. Lastly, USB cables may be used to connect the dispenser combined with the light fixture 275 directly into a USB computer port.

Figure 39:
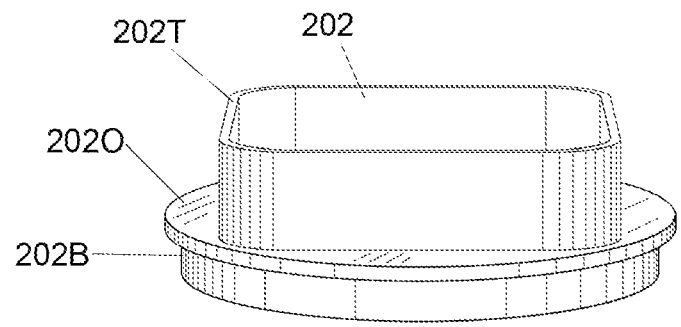
FIG. 39 is a perspective view of an exemplary bottle collar in accordance with one aspect of the present application.

Referring to FIG. 39, a perspective view of another embodiment of a removable bottle collar, the removable bottle collar 202 (hereinafter bottle collar 202) may be seen. A rounded rectangular top enclosure 202T of the bottle collar 202 may be formed to engage a rounded rectangular body of an inverted water supply bottle 95 (hereinafter supply bottle 95) as shown in FIG. 41. The outer portion 202O, and a bottom ring 202B of the bottle collar 202 may be seen.

Figure 40:
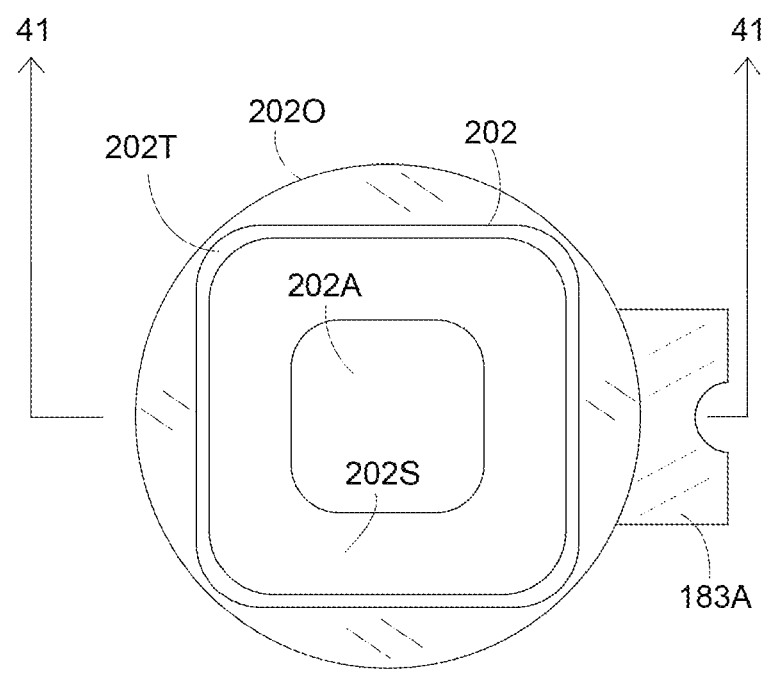
FIG. 40 is an orthogonal top view of the exemplary bottle collar and an exemplary rim section in accordance with one aspect of the current application.

Referring to FIG. 40, a top view of rounded rectangular top enclosure 202T, a bottle seat 202S, and a center aperture 202A of bottle collar 202 may be seen. An outer portion 202O of bottle collar 202 may be removably engaged upon rim section 183A.

Referring to FIG. 41, a sectional view of FIG. 40 may be seen. The rounded rectangular top enclosure 202T of the bottle collar 202 may be formed to engage the rounded rectangular body of the supply bottle 95. The rounded rectangular top enclosure 202T may surround a portion of a sidewall 95S of the body of the supply bottle 95. The rounded rectangular top enclosure 202T may be formed to restrict a lateral movement of the supply bottle 95 inverted and positioned therein. The bottle seat 95S may merge with the top enclosure 202T. The bottle seat 95S may be formed to removably engage the supply bottle 95 on a portion of the angled neck 95N thereof. The angled neck 95N of the supply bottle 95 begins at the shoulder 102 of the supply bottle 95. The bottle seat 202S may have the center aperture 202A where a mouth 95M of the supply bottle 95 may extend there through into the base cavity 168 when the supply bottle 95 may be inverted and positioned thereon. The outer portion 202O of the bottle collar 202 may merge with the bottle seat 202S and the rounded rectangular top enclosure 202T of the bottle collar 202. The outer portion 202O of the bottle collar 202 may be formed to removably engage upon the rim top 183T of the rim section 183A. Thus, the bottle collar 202 may be removably engaged upon the rim section 183A. The bottom ring 202B may merge with the outer portion 202O of the bottle collar 202. The bottom ring 202B may be positioned on the inside of the rim section 183A, and may be formed to restrict a lateral movement of the bottle collar 202 upon the rim section 183A. The bottom ring 202B could also be formed on the outside of the rim section 183A to restrict the lateral movement of the bottle collar 202 upon the rim section 183A. The sectional view of the bottle collar 202 could also represent a sectional view of a bottle collar formed for a bottle (not shown) with a circular body like the supply bottle of 94 of FIG. 38, but having the angled neck 95N like the neck of the supply bottle 95.

Figure 42:
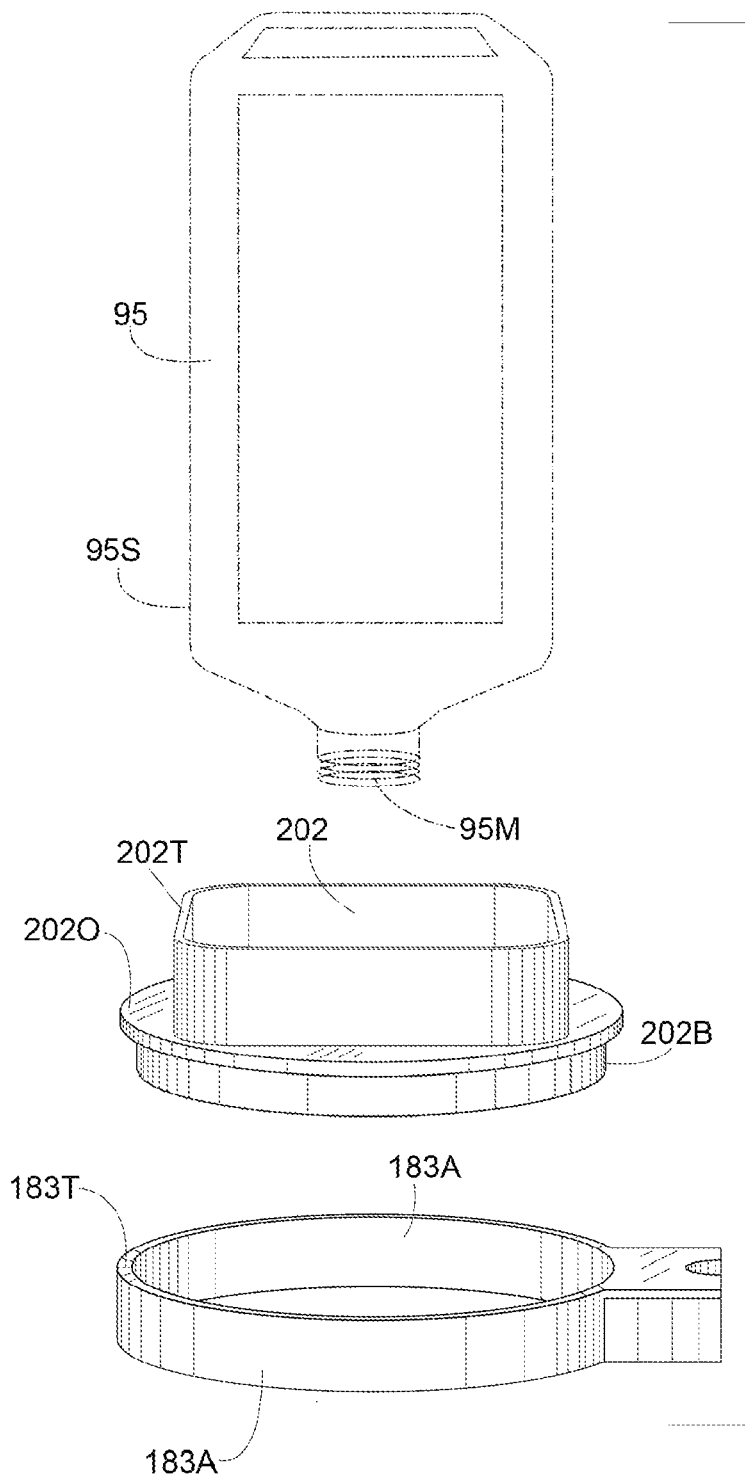
FIG. 42 is an exploded view of the exemplary bottle, the exemplary bottle collar and the exemplary rim section of FIG. 41 in accordance with one aspect of the present application.
Figure 43:
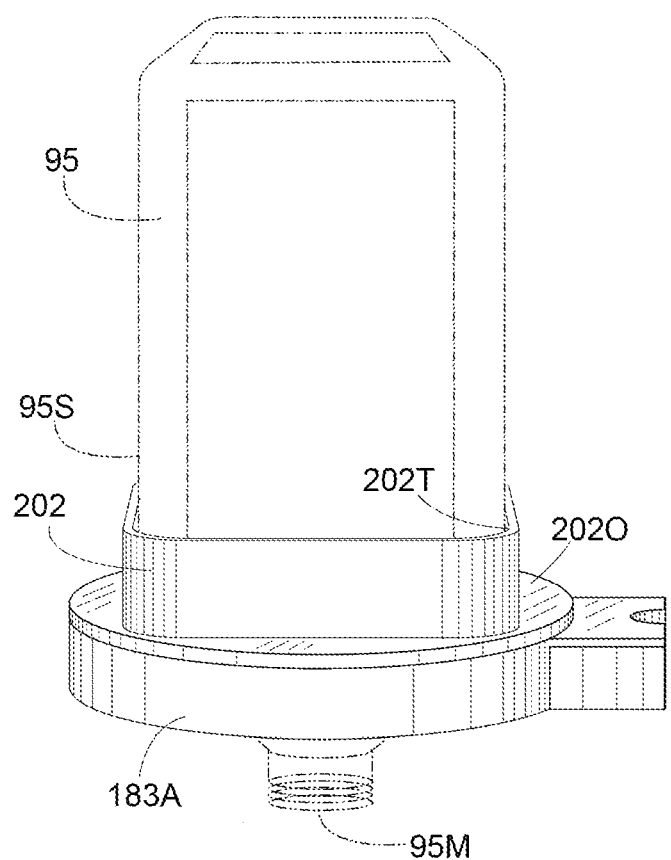
FIG. 43 is a perspective view of an exemplary bottle, the exemplary bottle collar, and the exemplary rim section in accordance with one aspect of the present application.

An exploded view of FIG. 41 and FIG. 43 may be seen in FIG. 42. One may see the rim section 183A, and the rim top 183T. Looking at the bottle collar 202, the outer portion 202O of the bottle collar 202 may be seen. The outer portion 202O of the bottle collar 202 may be removably engaged upon the rim top 183T of the rim section 183A. The bottom ring 202B may restrict the lateral movement of the bottle collar 202 while engaged upon the rim top 183T of the rim section 183A. The bottle collar 202 may engage and support the supply bottle 95 while inverted and positioned within the rim section 183A. The rounded rectangular top enclosure 202T may be formed to engage the supply bottle 95 and restrict the lateral movement of the supply bottle 95 inverted and positioned therein. A portion of the sidewall 95S of the body of the supply bottle 95 may be surrounded by the rounded rectangular top enclosure 202T. The bottle mouth 95M may be seen in the present embodiment.

Referring to FIG. 43, a perspective front view of the supply bottle 95, the bottle collar 202 and the rim section 183A may be seen. The bottle collar 202 may be seen removably engaged upon the rim section 183A. The bottle collar 202 may be adapted to engage and support the supply bottle 95 while the supply bottle 95 may be inverted and positioned within the rim section 183A. A portion of the sidewall 95S of the supply bottle 95 may be surrounded by the rounded rectangular top enclosure 202T. The outer portion 202O of the bottle collar 202 may be removably engaged upon the rim section 183A. The liquid (hereinafter water) from the supply bottle 95 may be delivered from the mouth 95M of the supply bottle 95.

Figure 44:
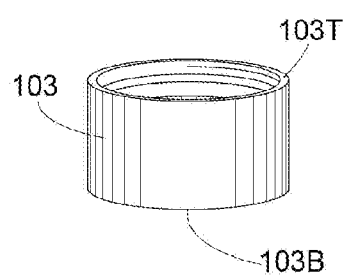
FIG. 44 is a perspective view of an exemplary bottle union used with the exemplary water bottle dispenser in accordance with one aspect of the present application.

Referring to FIG. 44, a perspective view of the bottle union 103 may be seen. As shown in FIGS. 4 and 4V, the bottle union 103 may have a union bottom 103B that may connect to the dispenser valve 74 and/or dispenser valve 76. Threads may be formed within an interior perimeter of the bottle union 103. The threads may be used to engage threads formed on the valve top 82 of the dispenser valve 74 and the valve top 82 of the dispenser valve 76. A top 103T of the bottle union 103 may be formed so that the threads formed in the interior of the bottle union 103 engage with threads formed on a mouth 94M of the supply bottle 94.

Figure 45:
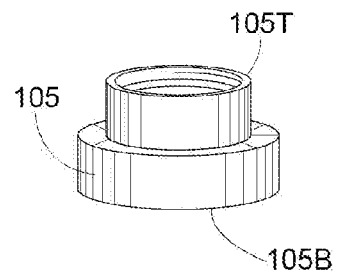
FIG. 45 is a perspective view of an exemplary bottle union used with the exemplary water bottle dispenser in accordance with one aspect of the present application.

Referring to FIG. 45 a perspective view of another embodiment of a bottle union, a bottle union 105 may be seen. The bottle union 105 may be described referring to FIGS. 4 and 4V. The same functionality of bottle union 103 may apply to bottle union 105. However, in the embodiment of FIG. 45, a top diameter of a union top 105T may be smaller than a bottom diameter of a union bottom 105B. The union top 105T may be formed to fit the threaded mouth 94M of the supply bottle 94 in which the diameter of the specific bottle mouth may be smaller than the union bottom 105B that engages with the dispenser valve 74 and/or dispenser valve 76.

Figure 46:
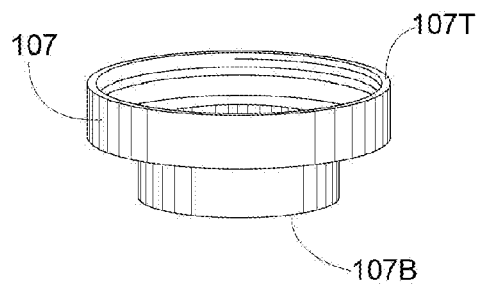
FIG. 46 is a perspective view of an exemplary bottle union used with the exemplary water bottle dispenser in accordance with one aspect of the present application.

FIG. 46 may show a perspective view of another embodiment of a bottle union, a bottle union 107. Bottle union 107 can also be described referring to FIGS. 4 and 4V. The same functionality of bottle unions 103 and/or 105 may apply to the bottle union 107. However, in the embodiment of FIG. 46, a top diameter of a union top 107T may be larger than a bottom diameter of a union bottom 105B. The union top 107T may be formed to fit the threaded mouth of the supply bottle 94 in which the diameter of the specific bottle mouth may be larger than the union bottom 107B that may engage with dispenser valve 74 and/or dispenser valve 76.

Figure 47:
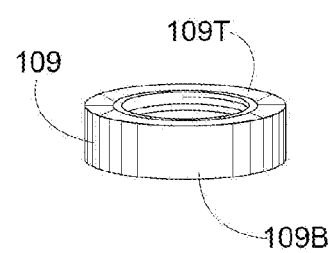
FIG. 47 is a perspective view of an exemplary bottle union used with the exemplary water bottle dispenser in accordance with one aspect of the present application.

One more embodiment of a bottle union, the bottle union 109 may be seen in FIG. 47. The FIGS. 4 and 4V may also be used to describe the bottle union 109. The bottle union 109 may locate the threads of a union top 109T that connect to a bottle mouth, within the diameter of the threads of a union bottom 109B that may connect with the threads of the valve top 82 of the dispenser valve 74 and/or dispenser valve 76. The result may be a shorter, and more compact bottle union than the bottle union 105. However, if the bottle mouth 94M, and the threaded valve top 82 are of the same diameter as in FIGS. 4 and 4V, construction of the bottle union 109 may not be possible, and the bottle union 103 would probably be used. In addition, the bottle union 109 may also be used as a substitute for the bottle union 107 if flipped. If this were the case, the threaded valve top 82 may connect to the union top 109T and the bottle mouth 94M may connect to the union bottom 109B.

Figure 48:
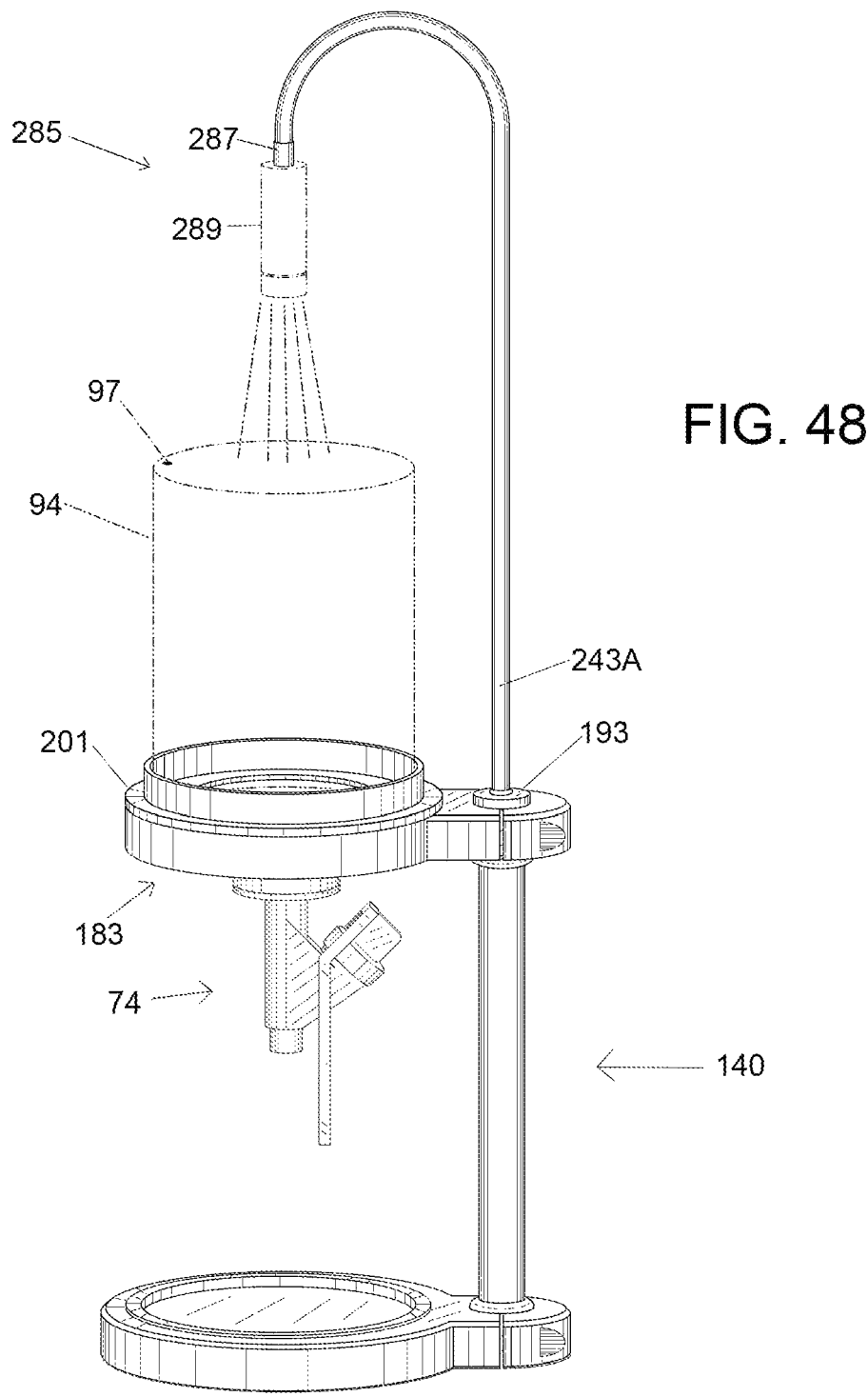
FIG. 48 is a perspective side view of the exemplary embodiment of the water bottle dispenser the exemplary fixture stem, and an exemplary self-powered light fixture in accordance with one aspect of the present application.

Referring to FIG. 48, the dispenser may be combined with an alternative light fixture 285. Light fixture 285 may include an assembly of a compression male adapter 287 and a self-powered light 289. In the present embodiment the self-powered light 289 may be attached to the fixture stem 243A and may be a cordless source of illumination of the supply bottle 94. The fixture stem 243A may be seen engaging with the bushing 193 of the dispenser base 140 and extending vertically therefrom. The compression male adapter 287 may be attached to the fixture stem 243A. The self-powered light 289 may attach to the compression male adapter 287. The self-powered light 289 may be aimed downward at the supply bottle 94. The supply bottle 94 may be positioned within bottle collar 201, and the bottle collar 201 may be removably engaged upon rim 183 of the dispenser base 140. The dispenser valve 74 may be attached to the supply bottle 94. The vent hole 97 may be seen in the present embodiment.

Referring to FIGS. 4, 37, and 48, the operation of the alternative light fixture 285 engaging with the dispenser base 140 of FIG. 48 may now be disclosed. The dispenser may be placed on the top surface of a countertop, tabletop or desktop. Next, the fixture stem 243A may be rotated counterclockwise or clockwise enough so that the self-powered light 289 may be moved away from the rim 183 for rotation of the fixture stem 243A. As may be seen in FIG. 48, the bottle collar 201 may be removably engaged upon the rim 183. Now the dispenser valve 74 may be threadably secured on the bottle mouth 94M (shown in FIG. 4) of an upright supply bottle 94 (upright illustration of the supply bottle 94 not shown). At this point the supply bottle 94 may be inserted into the bottle collar 201. The supply bottle 94 with the dispenser valve 74 attached, may be inverted and lowered into position into the bottle collar 201 of the dispenser base 140. Now the fixture stem 243A may be rotated so that self-powered light 289 may be centered over the supply bottle 94. Next a vent hole 97 may be administered into the supply bottle 94. The dispenser may now be ready for service.

Figure 49:
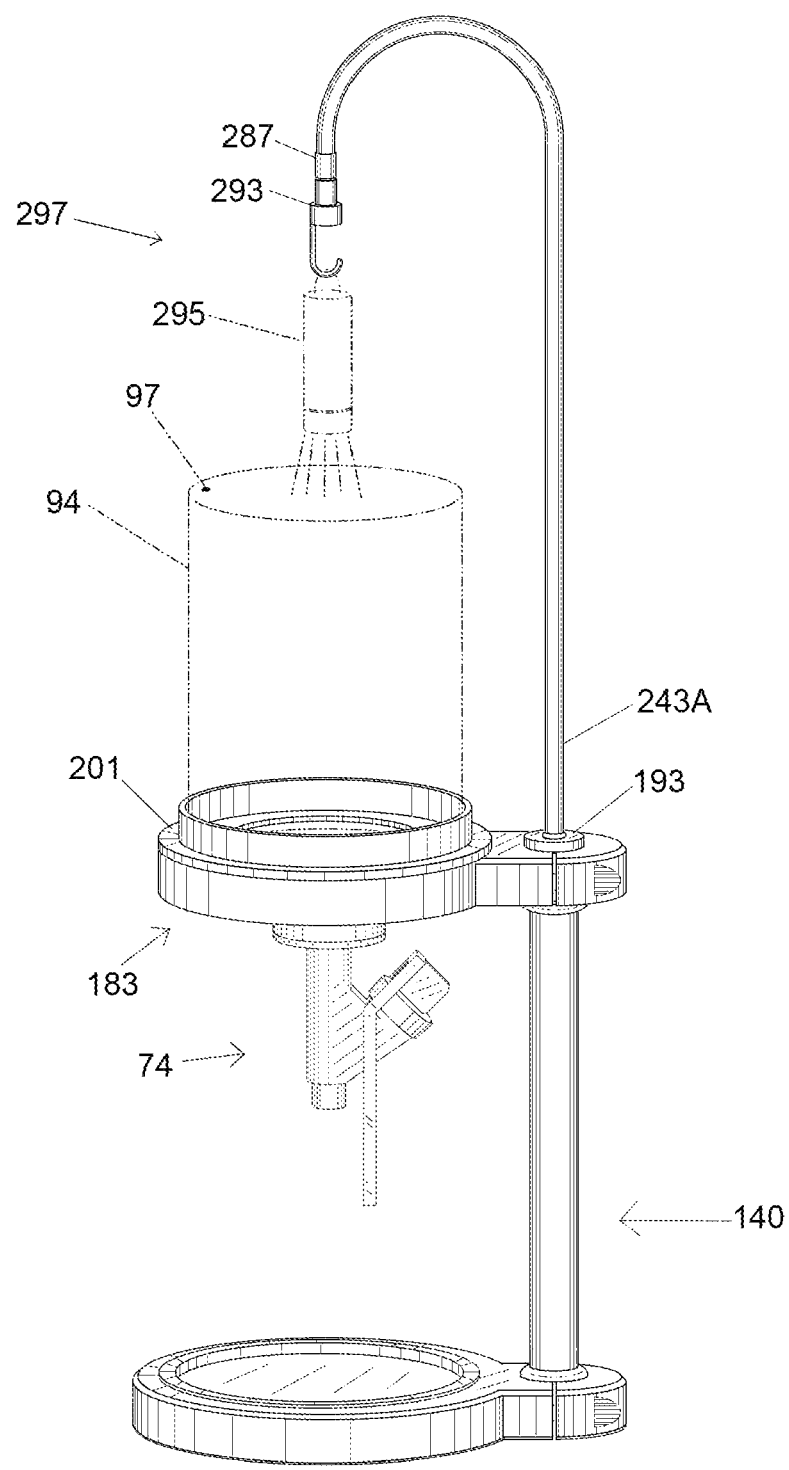
FIG. 49 is a perspective side view of the exemplary water bottle dispenser, the exemplary fixture stem, and an exemplary flashlight hook attachment in accordance with one aspect of the present application.

Referring to FIG. 49, the dispenser may be combined with an additional alternative light fixture 297. Light fixture 297 may include an assembly of the compression male adapter 287, a hook 293, and a self-powered light 295. In this embodiment, the self-powered light 295 may be suspended from the hook 293 attached to the fixture stem 243A. The self-powered light 295 may be a cordless source of illumination of the supply bottle 94. The fixture stem 243A may be seen engaging with the bushing 193 of the dispenser base 140 and extending vertically therefrom. The compression male adapter 287 may attach to the fixture stem 243A. The hook 293 may attach to the compression male adapter 287 of the fixture stem 243A. The hook 293 may be adapted to support the self-powered light 295 suspended therefrom. The supply bottle 94 may be removably engaged within the bottle collar 201, and the bottle collar 201 may be removably engaged upon the rim 183 of the dispenser base 140. The dispenser valve 74 may be coupled to the supply bottle 94. The vent hole 97 may be seen in the present embodiment.

Referring to FIGS. 4, 37 and 49, the operation of the alternative light fixture 297 of FIG. 49 may now be disclosed. The dispenser may be placed on the top surface of a countertop, tabletop or desktop. Next, the fixture stem 243A may be rotated counterclockwise or clockwise enough so the hook 293 is moved away from the rim 183, for rotation of the fixture stem 143A. The bottle collar 201 may be removably engaged upon the rim 183. The dispenser valve 74 may be threadably coupled onto the bottle mouth 94M of an upright supply bottle 94 (upright illustration of the supply bottle 94 not shown). At this point the supply bottle 94 may be installed into the bottle collar 201. The supply bottle 94 with bottle dispenser valve 74 attached may be inverted, and removably engaged into the bottle collar 201. Now fixture stem 243A may be turned so that the hook 293 may be centered over the middle of the supply bottle 94. Finally a self-powered light 295 may be attached to the hook 293. A vent hole 97 may be administered into the supply bottle 94. The dispenser may now be ready for service.

The dispenser may provide numerous advantages. The dispenser may accommodate a variety of commercial water bottles that currently have no valve dispensers. The dispenser may provide the dispenser valve 74 and/or the dispenser valve 76. The dispenser may use the dispenser valve 74 that requires a vent hole in a supply bottle used with the dispenser valve 74. The outlet port of the dispenser valve 74 may be formed in vertical alignment with inlet port of the dispenser valve 74, and may deliver the liquid from the supply bottle to a location directly below a mouth of the supply bottle. Alternatively, the dispenser valve 76 may have a barbed tube outlet port 84 wherein a rubber tube may be connected to a check valve. The dispenser valve 76 may allow for the supply bottle to be set on its side or upright when placed in a refrigerator, wherein a vent hole may not be needed in the supply bottle with the dispenser valve 76. The dispenser valves 74 and 76 may be easily installed onto different water bottles. Once the dispenser valve 74 or dispenser valve 76 is installed, the supply bottle may be easily inserted into the dispenser base 140.

The dispenser base 140 may provide a retaining device 221 that may be attached to the dispenser base 140. The retaining device 221 may store a piercing tool 233. The piercing tool 233 may be readily available to administer a vent hole in the supply bottle used with dispenser base 140 in order for water to flow adequately from the supply bottle if a non-vented valve is used. Additionally, the bottle cap 147 of the supply bottle may be threadably secured to a threaded cylinder 219 of the retaining device 221. Thus the retaining device 221 may prevent the bottle cap 147 from becoming lost. Moreover, the dispenser may provide a support device 235 that may also engage the piercing tool 233 that may be used for administering a vent hole in the supply bottle. The piercing tool 233 may be magnetically engaged to the support device 235. The retaining device 221 and the support device 235 may releasably engage with the dispenser base 140. A light fixture 275 may contain an illumination source, and may be attached to a fixture stem that may engage with the dispenser base. A source of electrical power in communication with the illumination source may be provided. The light fixture may act as a nightlight in addition to illuminating the water bottle and may facilitate usage of the dispenser in a dark environment. A self-powered cordless illumination source option may be provided.

The dispenser generally requires no cleaning as water is dispensed directly from the single use water bottles. Spillage of water is generally unlikely from the mouth of the water bottle as the dispenser valve 74 and/or dispenser valve 76 may be installed prior to lifting of the water bottle, so the bottle wall generally will not push in and force water out of the mouth of the water bottle. Further water contamination of the bottled water is unlikely as the water is received through the dispenser valve 74 and/or dispenser valve 76. The dispenser may allow for smaller quantities of the 4 oz. to 24 oz. water bottles to be used since the dispenser may allow for more "gallon" or larger jugs to be used in households and may lead to an improvement in the environment.

While embodiments of the disclosure have been described in terms of various specific embodiments, those skilled in the art will recognize that the embodiments of the disclosure may be practiced with modifications within the spirit and scope of the claims. For example, other embodiments of valves/connectors may be used to dispense water from the water bottle. Different embodiments of piercing tools as well as different embodiments of mounting devices for the piercing tools may be used. Also, there are numerous ways and methods in which the base foot and the rim could be mounted to the tubular support, additionally the base foot could take on additional shapes/sizes other than the shape of the dispenser base foot mentioned in the above description. The receiving disk in the base foot could be excluded form the base. Furthermore, the dispenser could be used with inverted beverage bottles in addition to inverted water bottles. Accordingly, the scope should be determined not by the specific embodiments illustrated, but by the appended claims and their legal equivalents.

DRAWINGS—REFERENCE NUMERALS

70—dispenser valve (could be dispenser valve 74 or 76)
74—vertical dispenser valve assembly. Dispenser valve assembly 74 includes the following parts: valve body 74B, seat cup 85, peg 89, coil spring 90, component compartment bonnet 91, and valve activation lever 93.
74B—valve body
76—vented dispenser valve assembly. Vented dispenser valve assembly includes the following parts: valve body 76B, seat cup 85, peg 89, coil spring 90, component compartment bonnet 91, and valve activation lever 93.
76B—valve body
77—valve body outlet port
78—slanted component compartment
78T—component compartment top
82—valve body inlet port top
83—valve body inlet port
84—vent tube
84A—vent tube inlet port
84B—barbed vent tube outlet port
85—seat cup
85W—seat cup wall
87—sealing seat
89—peg
89B—peg base
89S—spring base
89R—right pin slot
89L—left pin slot
90—coiled spring
91—component compartment bonnet
92—peg aperture
93—valve activation lever
93R—valve activation lever right pin
93L—valve activation lever left pin
94—supply bottle
94N—bottle neck
94M—bottle mouth
94S—bottle sidewall
95—supply bottle
95N—bottle neck
95M—bottle mouth
95S—bottle sidewall
96—threaded bottle mouth
97—vent hole
98—water level
99T—top tube
99B—bottom tube
100—check valve
100T—top barbed outlet
100B—bottom barbed inlet
101—tube outlet
102—bottle shoulder
103—bottle union
103T—union top
103B—union bottom
105—bottle union
105T—union top
105B—union bottom
107—bottle union
107T—union top
107B—union bottom
109—alternative bottle union
109T—alternative bottle union top
109B—alternative bottle union bottom
140—dispenser base assembly. Base assembly 140 includes the following parts: footpad section 151A, footpad section 151B, nuts 155, spacers 157, bolts 159, foot section 171A, foot section 171B, receiving disc 173, tubular support 175, rim section 183A, rim section 183B, bushing 193, spacer 189 and bottle collar 201/202.
143—electric cord with conductive wire
145—cup
147—bottle cap
149B—division point
149T—division point
151—footpad assembly. Footpad assembly includes footpad sections 151A and 151B.
151A—footpad section
151B—footpad section
155—nut
157—spacer
159—bolt
169—bottom flange of tubular support 175
171—foot assembly. Foot assembly 171 includes foot section 171A, foot section 171B, footpad 151A, and footpad 151B, and receiving disc 173.
171A—foot section
171B—foot section
171R—foot nut and bolt cavity
171L—foot nut and bolt cavity
171X—clamping point
171Y—clamping point
173—receiving disc
175—tubular support
177—top flange of tubular support 175
179—raceway
183—rim assembly. Rim assembly includes rim section 183A, and rim section 183B
183A—rim section
183B—rim section
183R—rim nut and bolt cavity
183L—rim nut and bolt cavity
183T—rim top
183X—clamping point
183Y—clamping point
183W—rim inside wall
189—spacer
191A—engagement leg
191B—engagement leg
191C—engagement leg
193—bushing
194A—engagement port
194B—engagement port
194C—engagement port
201—removable circular bottle collar
201A—center aperture
201B—bottom ring
201O—outer portion
201S—bottle seat
201T—top enclosure
202—removable rounded rectangular bottle collar
202A—center aperture
202B—bottom ring
202O—outer portion
202S—bottle seat
202T—top enclosure
211—tubular support aperture
213—foot aperture
215—raceway
217—intersection 219—male threads
221—retaining cylinder mechanism
223—support member
225—magnet cavity
227—magnet
229—magnet hole
231—piercing tool spike
233—piercing tool
235—support device assembly. Support device assembly includes the following parts: support member 223, magnet 227, and piercing tool 233
237—magnet shelf aperture
239—magnet shelf
241—fixture stem flange
243A—fixture stem
243B—fixture stem
245B—machine screws
245T—machine screws
247—bracket compression cylinder
249—bracket hole
251—compression bracket
253—lamp housing screw hole
255—lamp housing hole
257—lamp housing
259—threaded screw hole
261T—bracket
261B—bracket
263—threaded cylinder bracket
265—threaded nipple
267—spacer screw holes
269—insulating spacer
271—spacer nipple hole
273—standard light bulb socket
275—light fixture assembly. Light fixture assembly 275 includes the following parts: machine screws 245T, 245B, compression bracket 251, lamp housing 257, threaded bracket 261T, 261B, threaded nipple 265, insulating spacer 269, standard light bulb socket 273.
277—flexible metallic tube
279—inline power switch
281—conductive wire
283—AC adaptive power plug
285—alternative light fixture assembly. Alternative lighting fixture assembly 285 includes: compression male adapter 287, and battery operated lighting device 289.
287—compression male adapter
289—battery operated lighting device
291—compression male adapter
293—flashlight hook fitting
295—flash light
297—alternative lighting fixture assembly. Alternative lighting fixture assembly 297 includes: compression male adapter 291, flash light hook fitting 293, and flashlight 295.

I claim:

1. A dispenser for delivering a liquid from an inverted supply bottle, comprising:
a dispenser valve comprising:
an inlet port formed in a valve body of the dispenser valve, the inlet port coupled to a mouth of the inverted supply bottle;
an outlet port formed directly below the inlet port in the valve body of the dispenser valve, the outlet port in liquid communication with the inlet port, and vertically aligned therewith;
a sealing seat formed in the valve body of the dispenser valve in liquid communication with the inlet and outlet ports;
a component compartment formed in the valve body of the dispenser valve having a threaded top;
a component compartment bonnet having a center aperture, the component compartment bonnet threadably secured to the threaded component compartment top;
a seat cup contiguous with the component compartment bonnet and housed within the component compartment controlling the flow of liquid through the dispenser valve, the liquid flowing through the dispenser valve halted when the seat cup is urged upon the sealing seat;
a peg housed within the component compartment with a base of the peg anchored within the seat cup and a slotted end of the peg extending through the aperture in the component compartment bonnet;
a coil spring surrounding the peg, the coil spring housed within the component compartment and contiguous with a spring base of the peg and the component compartment bonnet, the coil spring urging the seat cup against the sealing seat thus halting the flow of the liquid through the dispenser valve when the dispenser valve is not in use;
a valve activation lever attached to the slotted end of the peg, the valve activation lever pulling the peg further through the component compartment bonnet when forced further away from the outlet port of the dispenser valve, the valve activation lever compressing the coil spring and pulling the seat cup away from the sealing seat of the valve body and enabling the liquid from the supply bottle to flow through the dispenser valve; and
a union coupling the inlet port of the dispenser valve to a mouth of the inverted supply bottle.

2. The dispenser of claim 1 wherein the component compartment is slanted.

3. The dispenser of claim 1 wherein the valve activation lever has a horizontal bar formed below and to the side of the outlet port of the dispenser valve.

4. The dispenser of claim 1, comprising:
a vent tube in the dispenser valve body beginning at a vent tube inlet port of the dispenser valve body; and
a barbed vent tube outlet port.

5. A dispenser for delivering a liquid from an inverted supply bottle, comprising:
a dispenser valve comprising:
an inlet port formed in a valve body of the dispenser valve, the inlet port coupled to a mouth of the inverted supply bottle;
an outlet port formed directly below the inlet port in the valve body of the dispenser valve, the outlet port in liquid communication with the inlet port;
a sealing seat formed in the valve body of the dispenser valve in liquid communication with the inlet and outlet ports;
a component compartment formed in the valve body of the dispenser valve having a threaded top;
a component compartment bonnet having a center aperture, the component compartment bonnet threadably secured to the threaded component compartment top;
a seat cup contiguous with the component compartment bonnet and housed within the component compartment controlling the flow of liquid through the dispenser valve, the liquid flowing through the dispenser valve halted when the seat cup is urged upon the sealing seat;
a peg housed within the component compartment with a base of the peg anchored within the seat cup and a slotted end of the peg extending through the aperture in the component compartment bonnet;

a coil spring surrounding the peg, the coil spring housed within the component compartment and contiguous with a spring base of the peg and the component compartment bonnet, the coil spring urging the seat cup against the sealing seat thus halting the flow of the liquid through the dispenser valve when the dispenser valve is not in use;

a valve activation lever having a horizontal bar formed below and to the side of the outlet port of the dispenser valve, the valve activation lever attached to the slotted end of the peg, pulling the peg further through the component compartment bonnet when forced further away from the outlet port of the dispenser valve, compressing the coil spring, pulling the seat cup away from the sealing seat of the valve body and enabling the liquid from the supply bottle to flow through the dispenser valve; and a union coupling the inlet port of the dispenser valve to a mouth of the inverted supply bottle.

* * * * *